(12) United States Patent
White et al.

(10) Patent No.: US 12,372,139 B1
(45) Date of Patent: Jul. 29, 2025

(54) BICYCLE CHAIN WITH BUSHING LINK

(71) Applicant: BorgWarner, Inc., Auburn Hills, MI (US)

(72) Inventors: Timothy K. White, Sterling Heights, MI (US); Christopher Van Loon, Ithaca, NY (US); Marty Gardner, Dryden, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 18/410,015

(22) Filed: Jan. 11, 2024

(51) Int. Cl.
*F16G 13/06* (2006.01)

(52) U.S. Cl.
CPC .................. F16G 13/06 (2013.01)

(58) Field of Classification Search
CPC ........................................ F16G 13/06
USPC ........................................... 474/226
See application file for complete search history.

(56) References Cited

U.S. PATENT DOCUMENTS

| | | | |
|---|---|---|---|
| 2,568,650 A | 9/1951 | McIntosh et al. | |
| 3,379,072 A | 4/1968 | Kuntzmann | |
| 5,291,730 A | 3/1994 | Wu | |
| 5,362,282 A | 11/1994 | Lickton | |
| 5,520,585 A | 5/1996 | Green et al. | |
| 5,950,416 A | 9/1999 | Kerner et al. | |
| 7,722,492 B2 | 5/2010 | Santos | |
| 8,888,631 B2 | 11/2014 | Morita | |
| 10,260,596 B2 | 4/2019 | Ebinuma et al. | |
| 11,226,023 B2 | 1/2022 | Ribeiro et al. | |
| 2005/0202914 A1 | 9/2005 | Reiter et al. | |
| 2007/0249448 A1 | 10/2007 | Wu | |
| 2022/0196115 A1 | 6/2022 | Saito et al. | |

FOREIGN PATENT DOCUMENTS

| | | |
|---|---|---|
| DE | 102007018360 A1 | 10/2007 |
| FR | 58010 E | 9/1953 |
| JP | 2015072053 A | 4/2015 |
| JP | 2015102238 A | 6/2015 |
| JP | 2018076886 A | 5/2018 |
| JP | 2020016260 A | 1/2020 |
| JP | 2023147573 A | 10/2023 |
| WO | 2017080315 A1 | 5/2017 |

OTHER PUBLICATIONS

International Search Report for PCT/US2025/011113 dated May 9, 2025.

*Primary Examiner* — Henry Y Liu
(74) *Attorney, Agent, or Firm* — Brown & Michaels, PC

(57) ABSTRACT

A bicycle chain which includes internal links which are formed to act as both a rotating joint for the pin and a supporting surface for the roller. Two internal links together form an internal link assembly, along with rollers and bushings.

6 Claims, 18 Drawing Sheets

BICYCLE CHAIN WITH BUSHING LINK

BACKGROUND

The present invention relates to bicycle chains, and more specifically to a bicycle chain with bushing link(s).

Traditionally, bicycle chains include a pin, external link plates, internal link plates with formed bushing and a roller. The formed bushing of the internal link plates supports the roller and allows for a pin to pass through with clearance. The internal link plate with the formed bushing has formed roller and pin contact surfaces to support the roller and be the rotating joint for the pin. The formed roller and pin contact surfaces are generally formed in one operation during manufacturing and are integral to the internal link plates.

To distinguish between the two of the same link within the chain, "a" and "b" are used. The links designated "a" and "b" have the same features.

FIGS. 1-2 show a prior art bicycle chain 1 which includes four elements-external link plates 2, internal link plates 7, pins 5 and rollers 6. The external link plates 2 have an external link body 4 defining a pair of apertures 3 of a first external link aperture 3a and a second external link aperture 3b. The external link body 4 has an external link outer face 11a and an external link inner face 11b adjacent to internal link plates 7. The internal link plates 7 have an internal link body 12 defining a pair of apertures 8 of a first internal link aperture 8a and a second internal link aperture 8b. The internal link body 12 further defines an internal link outer face 12a and an internal link inner face 12b. Extending axially from the internal link inner face 12b is a formed bushing 9 surrounding each of the first internal link aperture 8a and the second internal link aperture 8b. Concentrically surrounding each of the bushings 9 is a flat 10 on the internal link inner face 12b. The flats 10 form a roller contact surface and the bushings 9 form a pin contact surface.

The bicycle chain 1 is constructed by pressing PF a second pin 5b into the second external link aperture 3b of the second external link plate 2b and extends into the formed bushing 9 surrounding the first internal link aperture 8a of a second internal link plate 7b. The second pin 5b further extends through a first roller 6a and then through the formed bushing 9 surrounding the second internal link aperture 8b of the first internal link plate 7a and into a second external link aperture 3b of a first external link plate 2a.

A first pin 5a is pressed PF into the first external link aperture 3a of the first external link plate 2a and extends into the formed bushing 9 surrounding the second internal link aperture 8b of an adjacent second internal link plate (not shown but in line with second internal link plate 7b). The first pin 5a extends through the formed bushing 9 surrounding the first internal link aperture 8a of the first internal link plate 7a and into a first external link aperture 3b of a first external link plate adjacent to the first internal link plate shown. A clearance CL is present between the formed bushings 9 and the pins 5a, 5b. The rollers 6a and 6b are always clearance fit to the formed bushings 9.

In the prior art chain shown, formed roller and pin contact surfaces on the bushings 9 are present on the internal link plates 7 to support the rollers 6 and act as the rotating joint for the pins 5.

SUMMARY

According to one embodiment of the present invention, a bicycle chain is disclosed. The bicycle chain comprising: a plurality of internal link assemblies interleaved and connected into a series of non-guide rows, a plurality of external link plates each of the external link plates having a pair of apertures, the external link plates being placed outside of alternate rows of internal link assemblies to form guide rows; rollers received between the second internal link inner face of the second internal link body and the first internal link inner face of the first internal link body and on the first internal link plate bushing and the second internal link plate bushing; and connecting pins extending across the rows of the bicycle chain and having ends received by the pair of apertures of the plurality of external link plates, thereby connecting the external link plates and the internal link assemblies.

Each internal link assembly comprising: a first internal link plate comprises a first internal link body having a first internal link inner face, a first internal link outer face opposite the first internal link inner face, the first internal link body defining a first internal link aperture, a second internal link aperture separated from the first internal link aperture by a middle portion, the first internal link aperture and the second internal link aperture extending from the first internal link inner face through to the first internal link outer face, wherein the first internal link aperture has a first diameter and the second internal link aperture has a second diameter, the second diameter of the second internal link aperture being greater than the first diameter of the first internal link aperture; a first internal link plate bushing received within the second internal link aperture in the first internal link plate having an outer circumference and a circumferential inner surface. A second internal link plate comprises a second internal link body having a second internal link inner face, a second internal link outer face opposite the second internal link inner face, the second internal link body defining a first internal link aperture, a second internal link aperture separated from the first internal link aperture by a middle portion, the first internal link aperture and the second internal link aperture extending from the second internal link inner face through to the second internal link outer face, wherein the first internal link aperture has a first diameter and the second internal link aperture has a second diameter, the second diameter of the second internal link aperture being greater than the first diameter of the first internal link aperture; and a second internal link plate bushing received within the second internal link aperture in the second internal link plate having an outer circumference and a circumferential inner surface. The first internal link body is rotated 180 degrees relative to the second internal link body. The first internal link aperture of both the first and second link plates receive a pin.

At least a first connecting pin is received within a first aperture of a first external link plate of the plurality of external link plates, a first internal link aperture of the first internal link plate, through the second internal link plate bushing, the second internal link aperture of the second internal link plate, and the first aperture of a second external link plate of the plurality of external link plates, and at least a second connecting pin is received within the second aperture of the second external link plate, a second internal link aperture of the first internal link plate, through the first internal link plate bushing, through the first internal link aperture of the second internal link plate and the second aperture of the second external link plate, such that the first connecting pin passes through the first internal link aperture of the first internal link plate with a first clearance and through the second internal link plate bushing with a second clearance.

According to another embodiment of the present invention, a bicycle chain is disclosed. The bicycle chain comprises a plurality of internal link assemblies interleaved and connected into a series of non-guide rows, a plurality of external link plates each of the external link plates having a pair of apertures, the external link plates being placed outside of alternate rows of internal link assemblies to form guide rows; rollers received between the second internal link inner face of the second internal link body and the first internal link inner face of the first internal link body and on the first internal link plate bushing and the second internal link plate bushing; and connecting pins extending across the rows of the bicycle chain and having ends received by the pair of apertures of the plurality of external link plates, thereby connecting the external link plates and the internal link assemblies.

Each internal link assembly comprising: a first internal link plate comprising a first internal link body having a first internal link inner face, a first internal link outer face opposite the first internal link inner face, the first internal link body defining a first internal link aperture, a second internal link aperture separated from the first internal link aperture by a middle portion, the first internal link aperture and the second internal link aperture extending from the first internal link inner face through to the first internal link outer face, wherein the first internal link aperture has a first diameter and the second internal link aperture has a second diameter, the first diameter of the first internal link aperture being greater than the second diameter of the second internal link aperture; a first internal link plate bushing received within the second internal link aperture in the first internal link plate having an outer circumference, a circumferential inner surface, a first end and a second end; a second internal link plate comprising a second internal link body having a second internal link inner face, a second internal link outer face opposite the second internal link inner face, the second internal link body defining a first internal link aperture, a second internal link aperture separated from the first internal link aperture by a middle portion, the first internal link aperture and the second internal link aperture extending from the second internal link inner face through to the second internal link outer face, wherein the first internal link aperture has a first diameter and the second internal link aperture has a second diameter, the first diameter of the first internal link aperture being greater than the second diameter of the second internal link aperture; and a second internal link plate bushing received within the second internal link aperture in the second internal link plate having an outer circumference, a circumferential inner surface, a first end and a second end. The first internal link body is rotated 180 degrees relative to the second internal link body, such that the first end of the first internal link plate bushing is press fit into the second internal link aperture of the first internal link body and the second end of the first internal link plate bushing is clearance fit into the first internal link aperture of the second internal link body and the first end of the second internal link plate bushing is press fit into the second internal link aperture of the second internal link body and the second end of the second internal link plate bushing is clearance fit into the first internal link aperture of the first internal link body.

At least a first connecting pin is received within a first aperture of a first external link plate of the plurality of external link plates, a first internal link aperture of the first internal link plate, through the second internal link plate bushing, the second internal link aperture of the second internal link plate, and the first aperture of a second external link plate of the plurality of external link plates, and at least a second connecting pin is received within the second aperture of the second external link plate, a second internal link aperture of the first internal link plate, through the first internal link plate bushing, through the first internal link aperture of the second internal link plate and the second aperture of the second external link plate.

According to another embodiment of the present invention, a bicycle chain is disclosed. The bicycle chain comprises: a plurality of internal link assemblies interleaved and connected into a series of non-guide rows, a plurality of external link plates each of the external link plates having a pair of apertures, the external link plates being placed outside of alternate rows of internal link assemblies to form guide rows; rollers received between the second internal link inner face of the second internal link body and the first internal link inner face of the first internal link body and on the first internal link plate bushing and the second internal link plate bushing; and connecting pins extending across the rows of the bicycle chain and having ends received by the pair of apertures of the plurality of external link plates, thereby connecting the external link plates and the internal link assemblies.

Each internal link assembly comprising: a first internal link plate comprising a first internal link body having a first internal link inner face, a first internal link outer face opposite the first internal link inner face, the first internal link body defining a first internal link aperture, a second internal link aperture separated from the first internal link aperture by a middle portion, the first internal link aperture and the second internal link aperture extending from the first internal link inner face through to the first internal link outer face, wherein the first internal link aperture and the second internal link aperture of the first internal link body has a first diameter; a second internal link plate comprising a second internal link body having a second internal link inner face, a second internal link outer face opposite the second internal link inner face, the second internal link body defining a first internal link aperture, a second internal link aperture separated from the first internal link aperture by a middle portion, the first internal link aperture and the second internal link aperture extending from the second internal link inner face through to the second internal link outer face, wherein the first internal link aperture and the second internal link aperture has a second diameter, the first diameter of the first internal link aperture and the second internal link aperture of the first internal link body being greater than the second diameter of the first internal link aperture and the second internal link aperture of the second internal link plate; a first internal link plate bushing received within the second internal link aperture in the first internal link plate having an outer circumference, a circumferential inner surface, a first end and a second end; and a second internal link plate bushing received within the first internal link aperture in the first internal link plate having an outer circumference, a circumferential inner surface, a first end and a second end. The second internal link inner face of the second internal link body is opposite from the second internal link inner face of the first internal link body, such that the first end of the first internal link plate bushing is clearance fit into the second internal link aperture in the first internal link plate and a press fit is present between the outer circumference of the second internal link plate bushing and the first internal link aperture of the second internal link body, the second internal link plate bushing is clearance fit into the first internal link aperture of the first internal link plate and a press fit is present between the outer circumference of the second internal link plate bushing and the second internal link aperture of the second internal link body.

At least a first connecting pin is received within a first aperture of a first external link plate of the plurality of external link plates, through the second internal link plate bushing clearance fit into the first internal link aperture of the first internal link plate and through the first internal link aperture of the second internal link body in which the second end of the second internal link plate bushing is press fit and the first aperture of a second external link plate of the plurality of external link plates and at least a second connecting pin is received within a second aperture of the first external link plate of the plurality of external link plates, through the first internal link plate bushing clearance fit into the second internal link aperture of the first internal link plate and through the second internal link aperture of the second internal link body in which the second end of the first internal link plate bushing is press fit and the second aperture of a second external link plate of the plurality of external link plates.

According to another embodiment of the present invention, a bicycle chain is disclosed. The bicycle chain comprising: a plurality of internal link assemblies interleaved and connected into a series of non-guide rows, a plurality of external link plates each of the external link plates having a pair of apertures, the external link plates being placed outside of alternate rows of internal link assemblies to form guide rows; rollers received between the second internal link inner face of the second internal link body and the first internal link inner face of the first internal link body and on the first internal link plate bushing and the second internal link plate bushing; and connecting pins extending across the rows of the bicycle chain and having ends received by the pair of apertures of the plurality of external link plates, thereby connecting the external link plates and the internal link assemblies.

Each internal link assembly comprising: a first internal link plate comprises a first internal link body having a first internal link inner face, a first internal link outer face opposite the first internal link inner face, the first internal link body defining a first internal link aperture, a second internal link aperture separated from the first internal link aperture by a middle portion, the first internal link aperture and the second internal link aperture extending from the first internal link inner face through to the first internal link outer face, first internal link plate bushings received within the first internal link aperture and the second internal link aperture in the first internal link plate. A second internal link plate comprises a second internal link body having a second internal link inner face, a second internal link outer face opposite the second internal link inner face, the second internal link body defining a first internal link aperture, a second internal link aperture separated from the first internal link aperture by a middle portion, the first internal link aperture and the second internal link aperture extending from the second internal link inner face through to the second internal link outer face. Second internal link plate bushings are received within the first internal link aperture and the second internal link aperture of the second internal link plate.

At least a first connecting pin is received within a first aperture of a first external link plate of the plurality of external link plates, through the first internal link plate bushings in the first internal link plate through the second internal link plate bushings in the second internal link plates and through the first aperture of a second external link plate of the plurality of external link plates. At least a second connecting pin is received within the second aperture of the first external link plate of the plurality of external link plates, through first internal link plate bushings in the first internal link plate through the second internal link plate bushings in the second internal link plates and through the second aperture of a second external link plate of the plurality of external link plates. The first internal link plate bushings are press fit into the first internal link plates and the second internal link plate bushings are press fit into the second internal link plates. The connecting pins pass through the first and second internal link plate bushings with a clearance.

According to another embodiment, a bicycle chain is disclosed. A bicycle chain comprises a plurality of internal link assemblies interleaved and connected into a series of non-guide rows, a plurality of external link plates placed outside of alternate rows of internal link assemblies to form guide rows, rollers, and connecting pins.

Each internal link assembly comprising: a first internal link plate comprising a first internal link body having a first internal link inner face, a first internal link outer face opposite the first internal link inner face, the first internal link body defining a first internal link aperture, a second internal link aperture separated from the first internal link aperture by a middle portion, the first internal link aperture and the second internal link aperture extending from the first internal link inner face through to the first internal link outer face; a second internal link plate comprising a second internal link body having a second internal link inner face, a second internal link outer face opposite the second internal link inner face, the second internal link body defining a first internal link aperture, a second internal link aperture separated from the first internal link aperture by a middle portion, the first internal link aperture and the second internal link aperture extending from the second internal link inner face through to the second internal link outer face; a first internal link plate bushing having a first end, a second end, an outer circumference and a circumferential inner surface; and a second internal link plate bushing having an outer circumference, a circumferential inner surface, a first end and a second end. The first internal link body is rotated 180 degrees relative to the second internal link body, such that the first end of the first internal link plate bushing is clearance fit into the second internal link aperture of the first internal link body and the second end of the first internal link plate bushing is clearance fit into the first internal link aperture of the second internal link body and the first end of the second internal link plate bushing is clearance fit into the second internal link aperture of the second internal link body and the second end of the second internal link plate bushing is clearance fit into the first internal link aperture of the first internal link body.

The rollers are received between the second internal link inner face of the second internal link body and the first internal link inner face of the first internal link body and on the first internal link plate bushing and the second internal link plate bushing.

The connecting pins extend across the rows of the bicycle chain and having ends received by the pair of apertures of the plurality of external link plates, thereby connecting the external link plates and the internal link assemblies.

At least a first connecting pin is received within a first aperture of a first external link plate of the plurality of external link plates, a first internal link aperture of the first internal link plate, through the second internal link plate bushing, the second internal link aperture of the second internal link plate, and the first aperture of a second external link plate of the plurality of external link plates, and at least a second connecting pin is received within the second aperture of the second external link plate, a second internal link aperture of the first internal link plate, through the first internal link plate bushing, through the first internal link aperture of the second internal link plate and the second aperture of the second external link plate.

DETAILED DESCRIPTION

Figure 1:
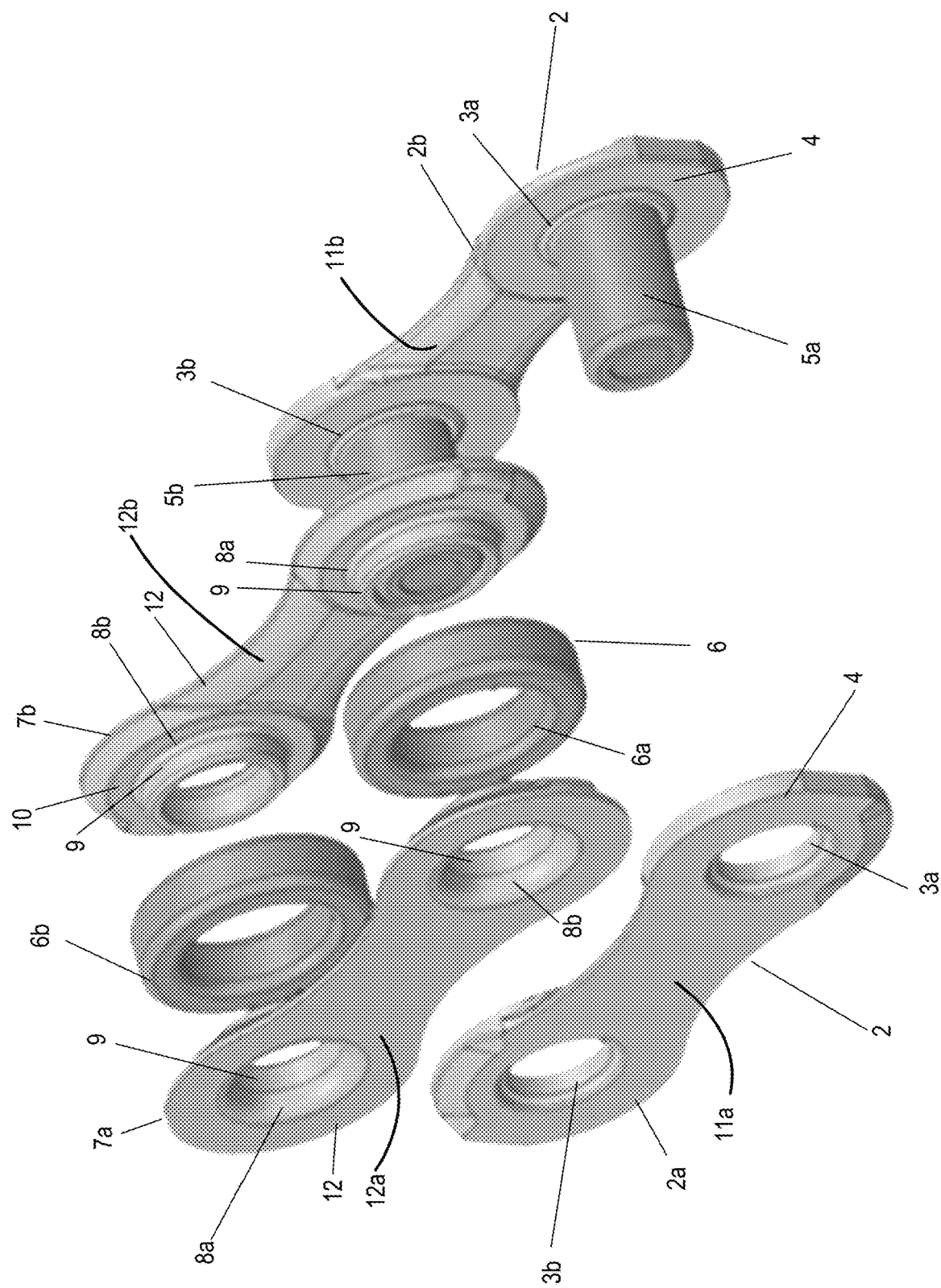
FIG. 1 shows an exploded view of a portion of a conventional bicycle chain.
Figure 2:
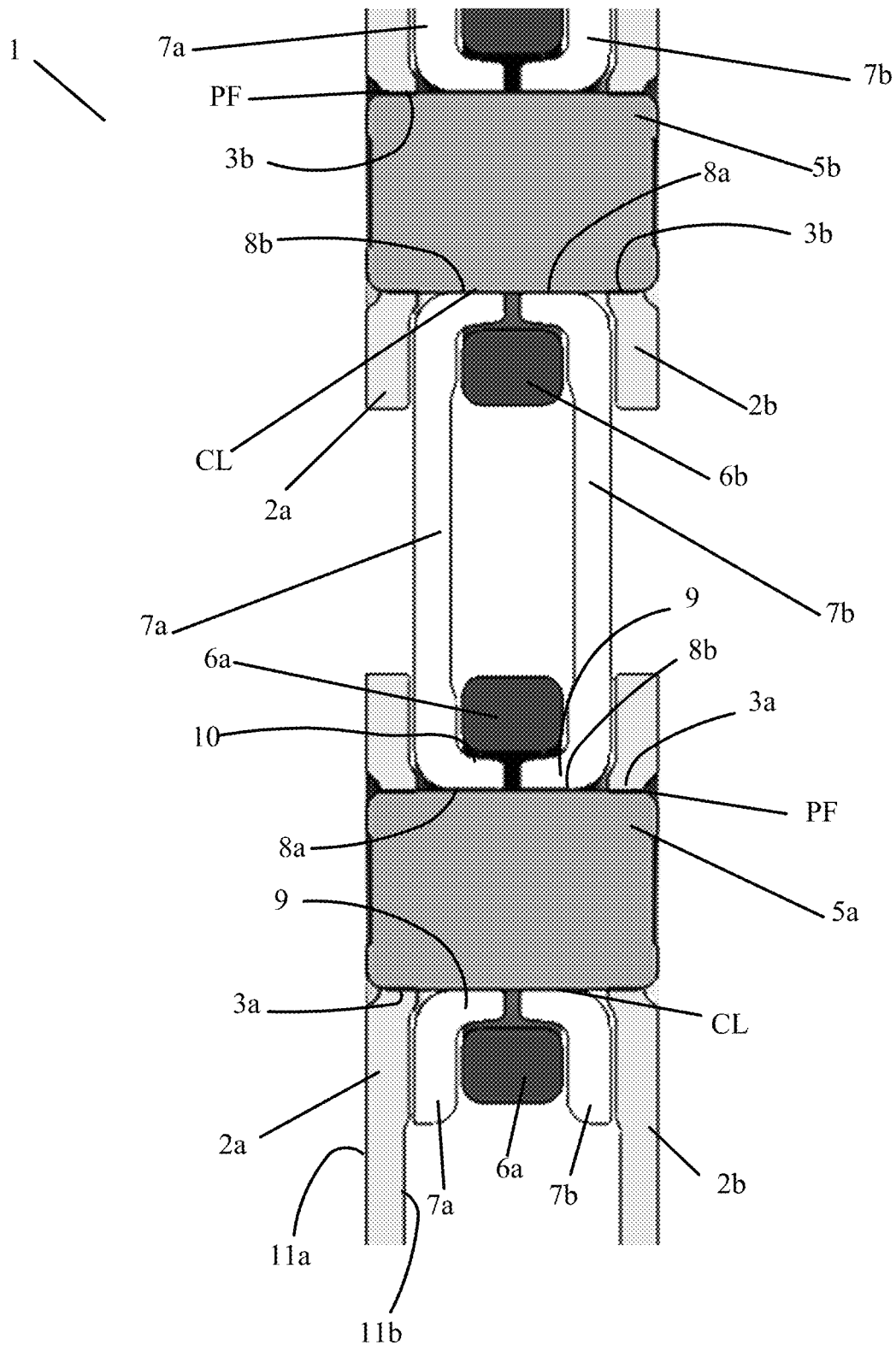
FIG. 2 shows a cross-sectional view of the conventional bicycle chain of FIG. 1.
Figure 3:
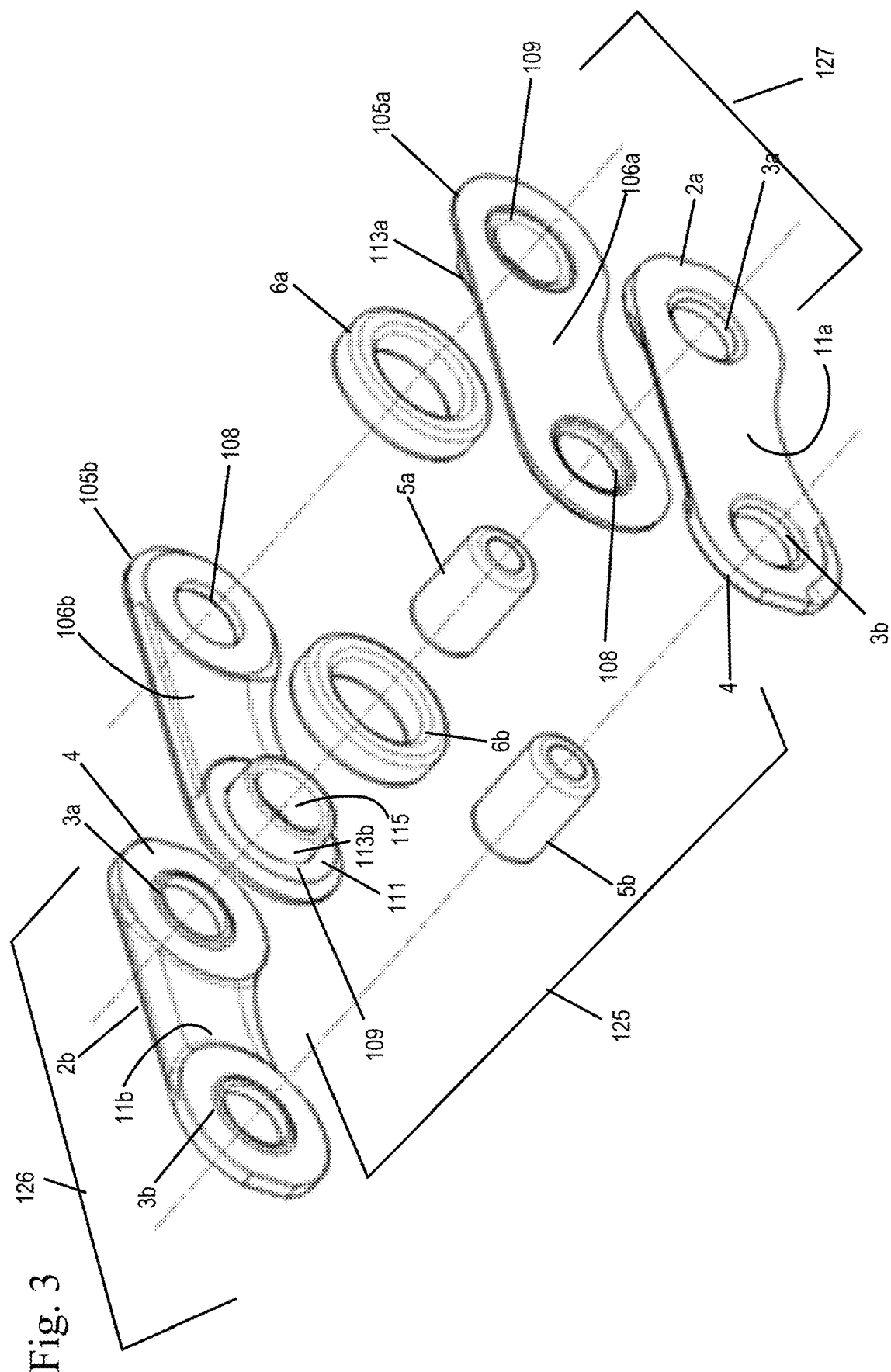
FIG. 3 shows an exploded view of a portion of a bicycle chain of a first embodiment.
Figure 4:
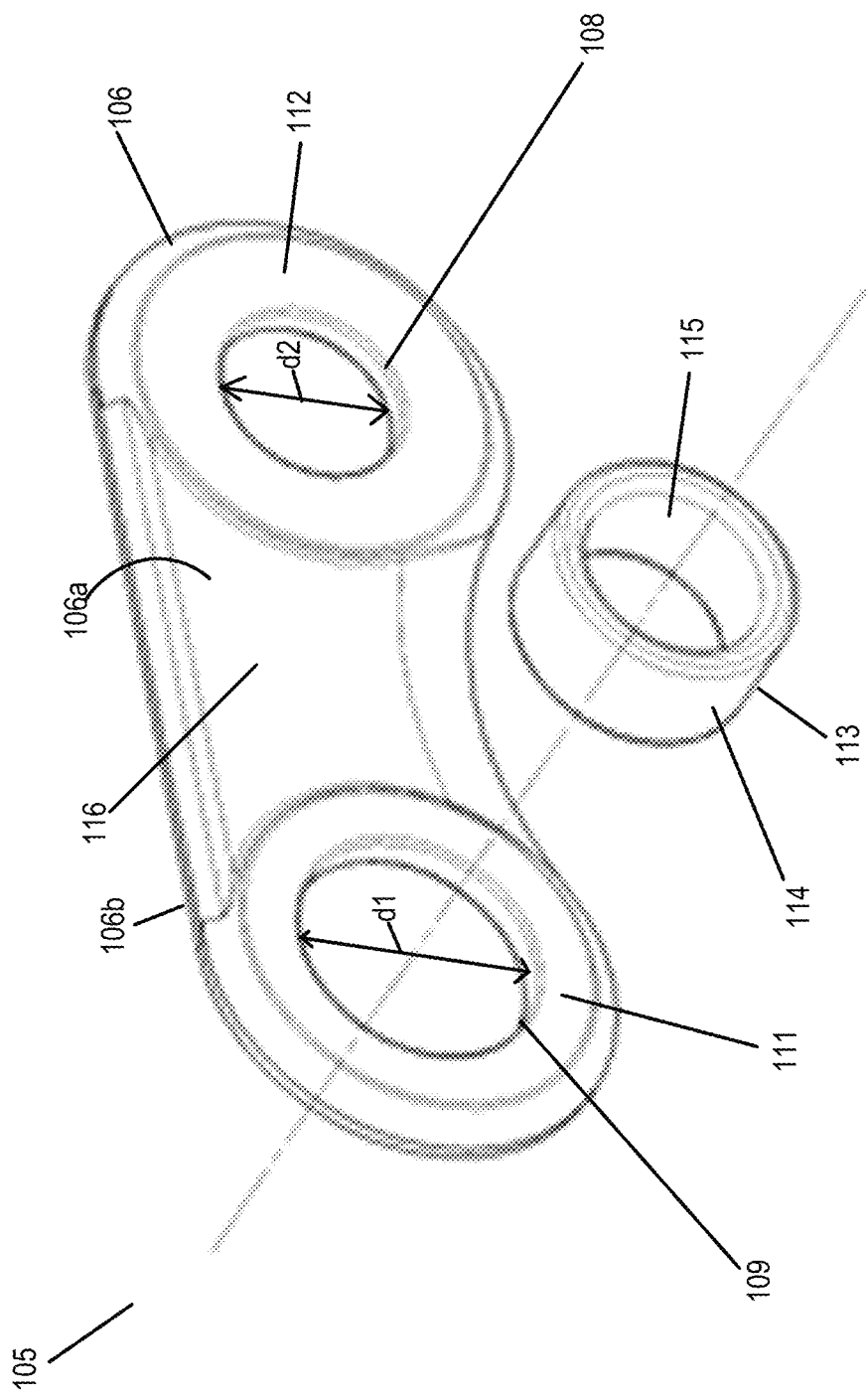
FIG. 4 shows an internal link plate of the first embodiment.
Figure 5:
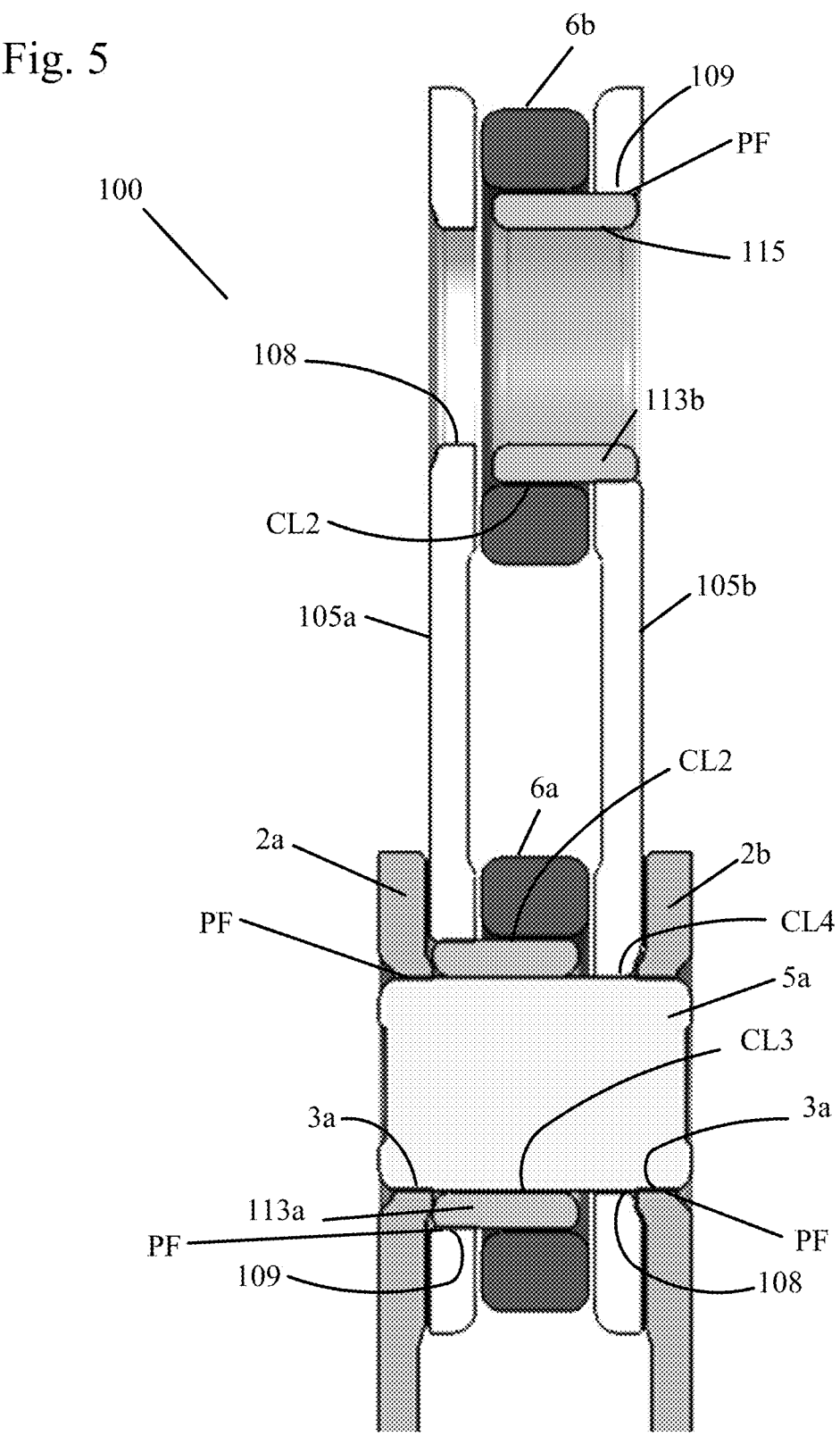
FIG. 5 shows a cross-sectional view of a portion of the laced bicycle chain of the first embodiment.

FIG. 3 shows an exploded view of the bicycle chain of the first embodiment. FIG. 4 shows an internal link of a first embodiment for a bicycle chain. FIG. 5 shows a cross-sectional view of the bicycle chain of the first embodiment.

To distinguish between the two internal link plates 105 of an internal link assembly 125, since the same internal link plate 105 is present within the internal link assembly 125 but flipped and rotated 180 degrees, the parts of the internal link plates are designated with the same number, with the two different internal link plates or internal link plates 105 being designated with an "a" or "b". It is noted that internal link plate 105a has the same features as internal link plate 105b. Similarly, the to distinguish between the two of the same external link within the bicycle chain, "a" and "b" are used. The links designated "a" and "b" but with the same number, have the same features.

In this embodiment, the internal link plates 105a, 105b each have an internal link body 106 with an internal link inner face 106b and an internal link outer face 106a. In one embodiment, the internal link outer face 106a is flat. The internal link outer face 106a is adjacent to an external link plate 2. The internal link plates 105a, 105b are asymmetric about a vertical centerline.

The internal link body 106 further defines a first internal link aperture 108 with a diameter d2 and a second internal link aperture 109 with a diameter d1. The diameter d1 of the second internal link aperture 109 is greater than the diameter d2 of the first internal link aperture 108. The first internal link aperture 108 and the second internal link aperture 109 are separated by a middle portion 116 of the internal link body 106. The first internal link aperture 108 and the second internal link aperture 109 each extend from the internal link inner face 106b through to the internal link outer face 106a. The second internal link aperture 109 receives a bushing 113, which is preferably press fit therein. The bushing 113 has a circumferential inner surface 115 and an outer circumference 114. The first internal link aperture 108 is preferably sized to receive a pin 5.

Surrounding the second internal link aperture 109 is a second aperture flat surface 111 which supports a roller 6b. Surrounding the first internal link aperture 108 is a first aperture flat surface 112 which supports another roller 6a.

Referring to FIGS. 3 and 5, an internal link assembly 125 which includes a first internal link plate 105a, a second internal link plate 105b rotated 180 degrees from the first internal link plate 105a, a first roller 6a, a second roller 6b, a first pin 5a, a second pin 5b, a first bushing 113a and a second bushing 113b. The internal link assembly 125 is placed between external link plates 2a, 2b.

A first pin 5a is received within a first external link aperture 3a of the first external link plate 2a, the first internal link aperture 108 of the first internal link plate 105a, through the circumferential inner surface 115 of the second bushing 113b, which is press fit within the second internal link aperture 109. The first pin 5a further extends through the first external link aperture 3a of the second external link plate 2b.

It is noted that the second pin 5b will be described relative to an adjacent internal link plate to internal link plates 105a, 105b. A second pin 5b is received within the second external link aperture 3b of the first external link plate 2a, a second internal link aperture 109 of the adjacent first internal link plate 105a in which a first bushing 113a is press fit. The second pin 5b passes through the circumferential inner surface 115 of the first bushing 113a, through the first roller 6a and into the first internal link aperture 108 of the adjacent second internal link plate 105b and into the second external link aperture 3b of the second external link plate 2b. The bushings 113 support the rollers 6.

A clearance CL2 is present between the rollers 6 and the bushings 113. Another clearance CL3 is present between the bushings 113 and the pins 5. The pins 5 are clearance fit CL4 into the first internal link apertures 108 of the internal link plates 105. While only a first pin 5a is shown, it is noted that the same clearances apply to the second pin 5b. The bushing 113 is press fit PF into the second internal link apertures 109 only of each of the internal link plates 105. The ends of the pins 5 are press fit PF into the apertures of the external link plates 2.

The first external link plate 2a and the second external link plate 2b are in guide rows 126 within the bicycle chain. The first internal link plate 105a and the second internal link plate 105b of the internal link assembly 125 are in non-guide rows 127 within the bicycle chain. The bicycle chain has a plurality of internal link assemblies 125 interleaved and connected in a series of non-guide rows 127, with the first and second external link plates 2a, 2b placed outside of alternate rows of internal link assemblies 125 within guide rows 126.

Figure 6:
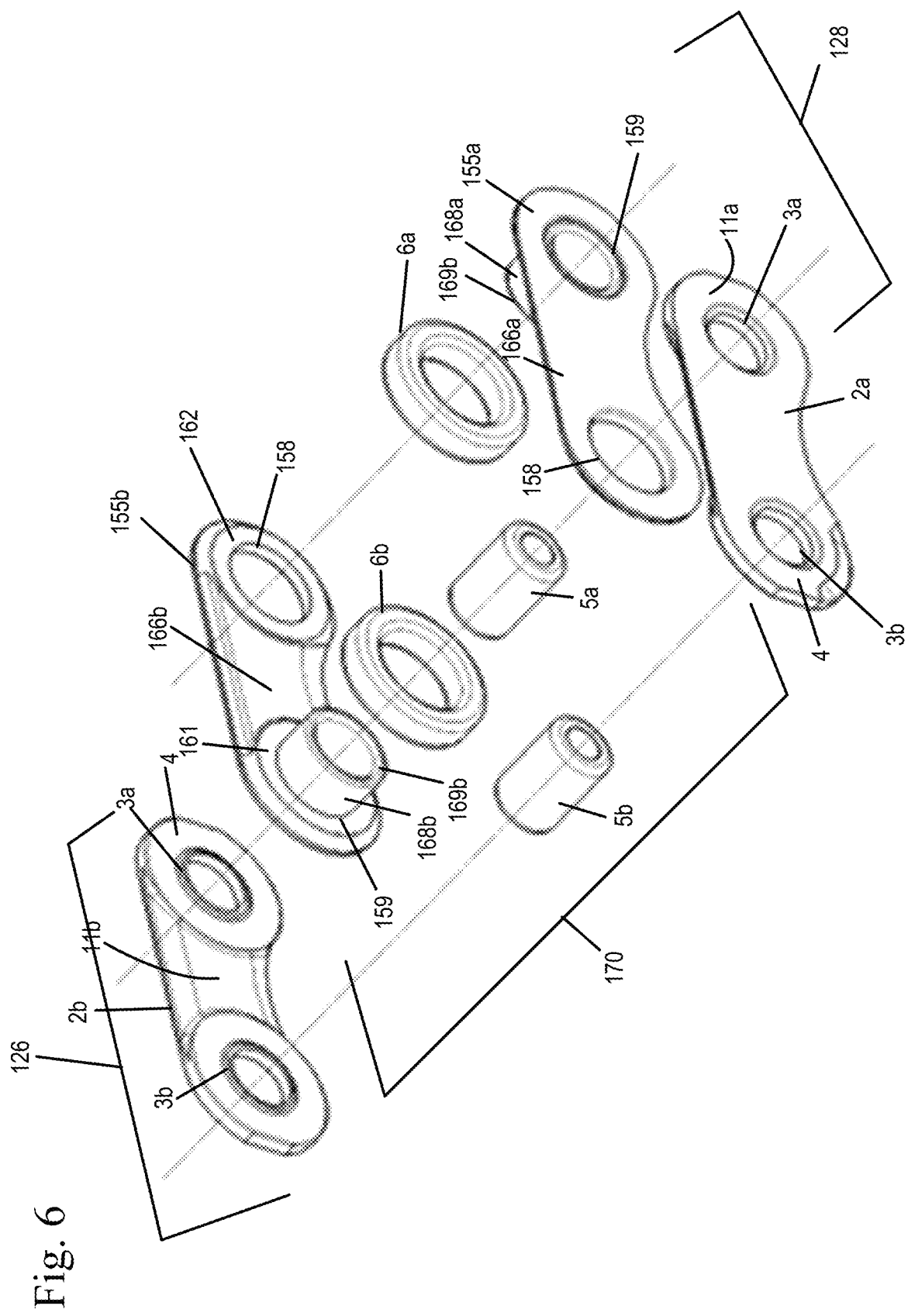
FIG. 6 shows an exploded view of a portion of a bicycle chain of a second embodiment.
Figure 7:
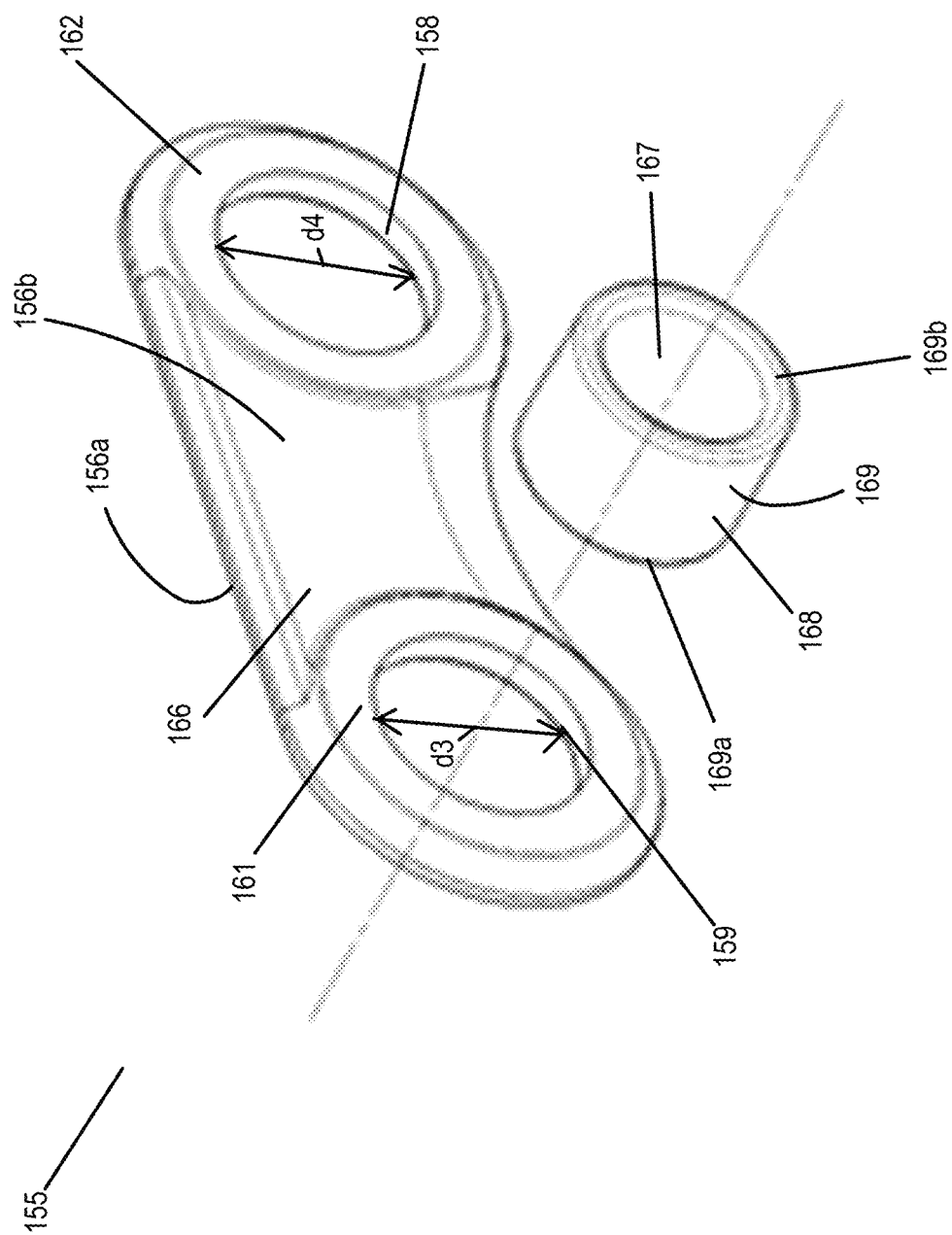
FIG. 7 shows an internal link plate of the second embodiment.
Figure 8:
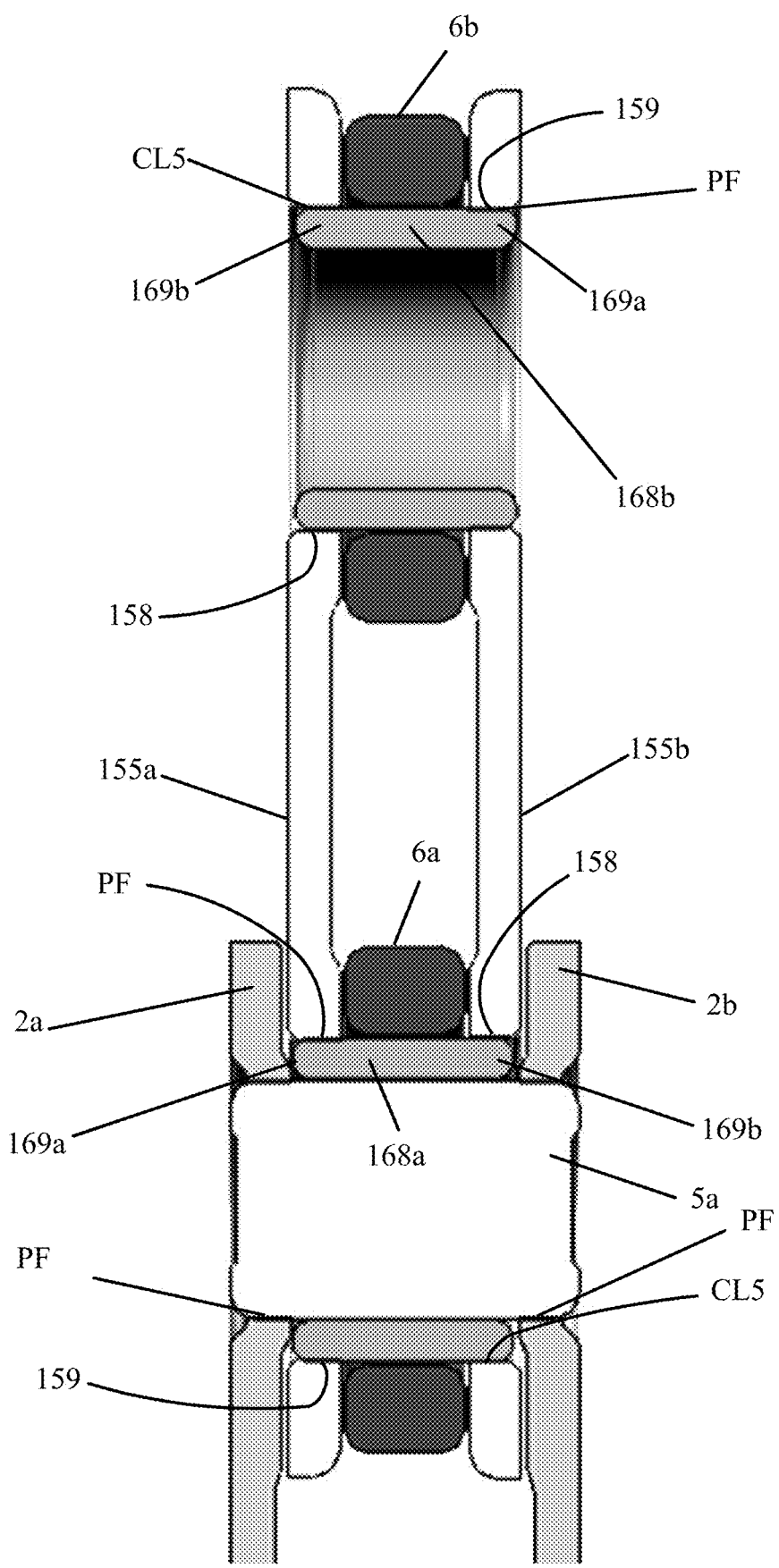
FIG. 8 shows a cross-sectional view of a portion of the laced bicycle chain of the second embodiment.

FIG. 6 shows an exploded view of the bicycle chain of a second embodiment. FIG. 7 shows an internal link of a second embodiment for a bicycle chain. FIG. 8 shows a cross-sectional view of the bicycle chain of the second embodiment.

To distinguish between the two internal link plates 155 of an internal link assembly 170, since the same internal link plate 155 is present, but flipped and rotated 180 degrees, the parts of the internal link plates are designated with the same number, with the two different internal link plates 155 being designated with an "a" or "b". It is noted that internal link plate 155a has the same features as internal link plate 155b. Similarly, to distinguish between the two of the same external links 2 within the bicycle chain, "a" and "b" are used. The links designated "a" and "b" but with the same number, have the same features.

In this embodiment, the internal link plates 155a, 155b each has an internal link body 156 with an internal link inner face 156b and an internal link outer face 156a. In one embodiment, the internal link outer face 156a is flat. The internal link outer faces 156a are adjacent to external link plates 2. The internal link plates 155a, 155b are asymmetric about a vertical centerline.

The internal link body 156 further defines a first internal link aperture 158 with a diameter d4 and a second internal link aperture 159 with a diameter d3. The diameter d3 of the second internal link aperture 159 is less than the diameter d4 of the first internal link aperture 158. The first internal link aperture 158 and the second internal link aperture 159 are separated by a middle portion 166 of the internal link body 156. The first internal link aperture 158 and the second internal link aperture 159 each extend from the internal link inner face 156b through to the internal link outer face 156a. The second internal link aperture 159 receives a bushing 168, which is preferably press fit therein. More specifically, a first end 169a of the bushing 168 is press fit into the second internal link aperture 159 of a first internal link plate 155a. The bushing 168 has a circumferential inner surface 165 and an outer circumference 164. It is noted that the bushing 168 is longer in length than the bushing 113 of the first embodiment so that a second end 169b of the same bushing 168 is received within a second internal link aperture 159 of a second internal link plate 155b.

Surrounding the second internal link aperture 159 is a second aperture flat surface 161 which supports a roller 6b. Surrounding the first internal link aperture 158 is a first aperture flat surface 162 which supports another roller 6a.

Referring to FIGS. 6 and 8, an internal link assembly 170 which includes a first internal link plate 155a, a second internal link plate 155b rotated 180 degrees from the first internal link plate 155a, a first roller 6a, a second roller 6b, a first pin 5a, a second pin 5b, a first bushing 168a and a second bushing 168b. The internal link assembly 170 is placed between external link plates 2a, 2b.

A first pin 5a is received within a first external link aperture 3a of the first external link plate 2a, the inner circumference 167 of the second end 169b of the second bushing 168b is clearance fit into the first internal link aperture 158 of the first internal link plate 155a, the first end 169a of the second bushing 168b press fit into the second internal link aperture 159 of the second internal link plate 155b. The second roller 6b surrounds the second bushing 168b. The first pin 5a further extends through the first external link aperture 3a of the second external link plate 2b.

It is noted that the second pin 5b will be described relative to an adjacent internal link plate to internal link plates 155a, 155b. A second pin 5b is received within the second external link aperture 3b of the first external link plate 2a, a second internal link aperture 159 of an adjacent first internal link plate to first internal link plate 155a in which a first end 169a of the first bushing 168a is press fit, and the second pin 5b passes through the inner circumference 167 of the first bushing 168a, through the second end 169b of the first bushing 168a, which is clearance fit into the first internal link aperture 158 of a second internal link plate 155b to second internal link plate 155b and into the second external link aperture 3b of external link plate 2b. The first roller 6a surrounds the outer circumference 169 of the first bushing 168a. The bushings 168a, 168b support the rollers 6a, 6b.

With the length of the bushings 168 being such that the first end 169a is press fit into a first internal link plate 155a and the second end 169b is clearance fit into the second internal link plate 155b, and provides a larger mating surface for internal link plates 155 than the bushings 113 in the first embodiment. In one embodiment, the bushings 168 are preferably made of a different material which is harder than the internal link plates 155 and the external link plates 2.

A clearance CL5 is present between the first internal link aperture 158 of the internal link plates 155 and the second end 169b of the bushings 168. The first end 169a of the bushings 168 are press fit into the second internal link apertures 159 of the internal link plates 155.

The first external link plate 2a and the second external link plate 2b are in guide rows 126 within the bicycle chain. The internal link plates 155a, 155b of the internal link assembly 170 are in non-guide rows 128 within the bicycle chain. The bicycle chain has a plurality of internal link assemblies 170 interleaved and connected in a series of non-guide rows 128, with the first and second external link plates 2a, 2b placed outside of alternate rows of internal link assemblies 170 within the guide rows 126.

Figure 9:
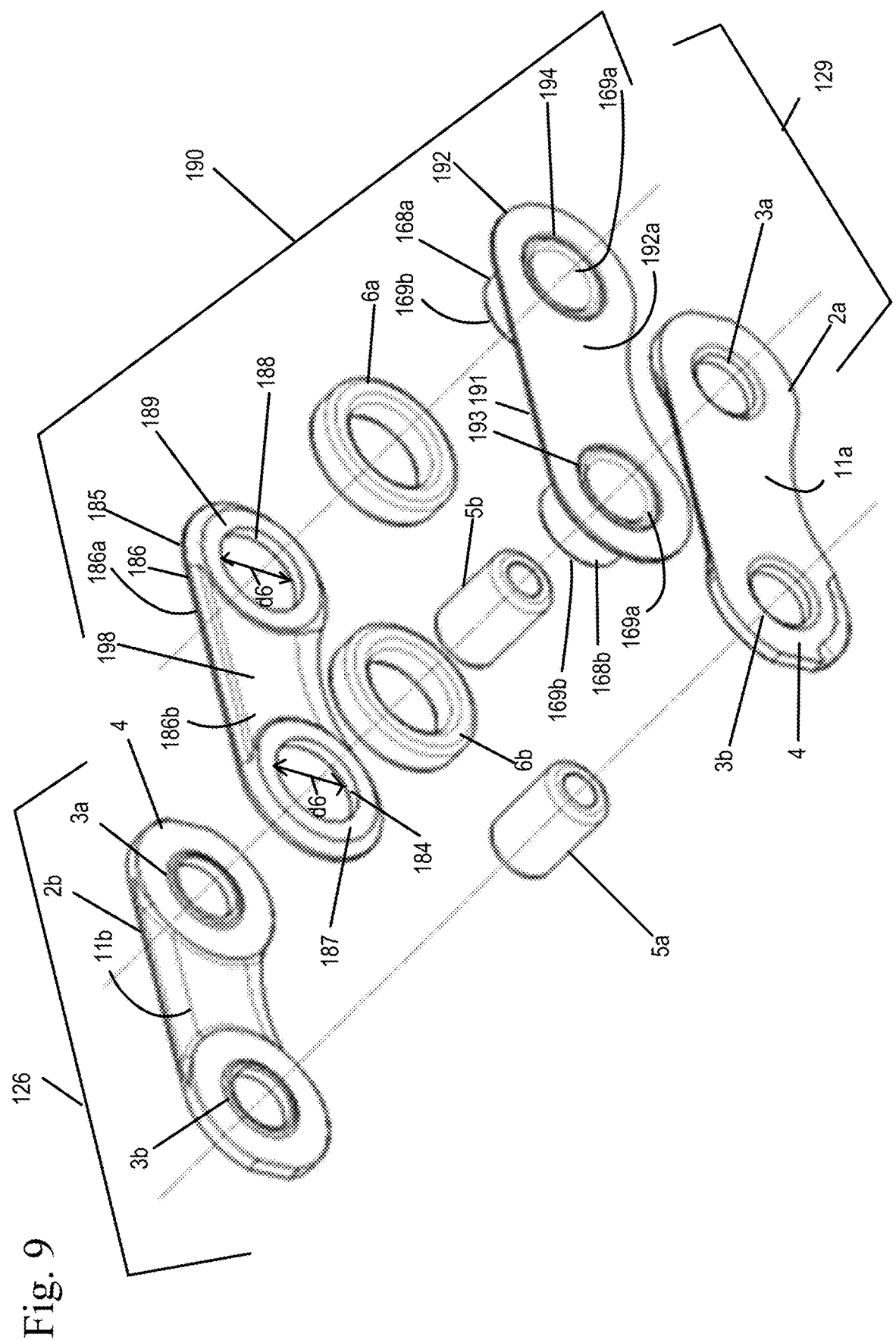
FIG. 9 shows an exploded view of a portion of a bicycle chain of a third embodiment.
Figure 10:
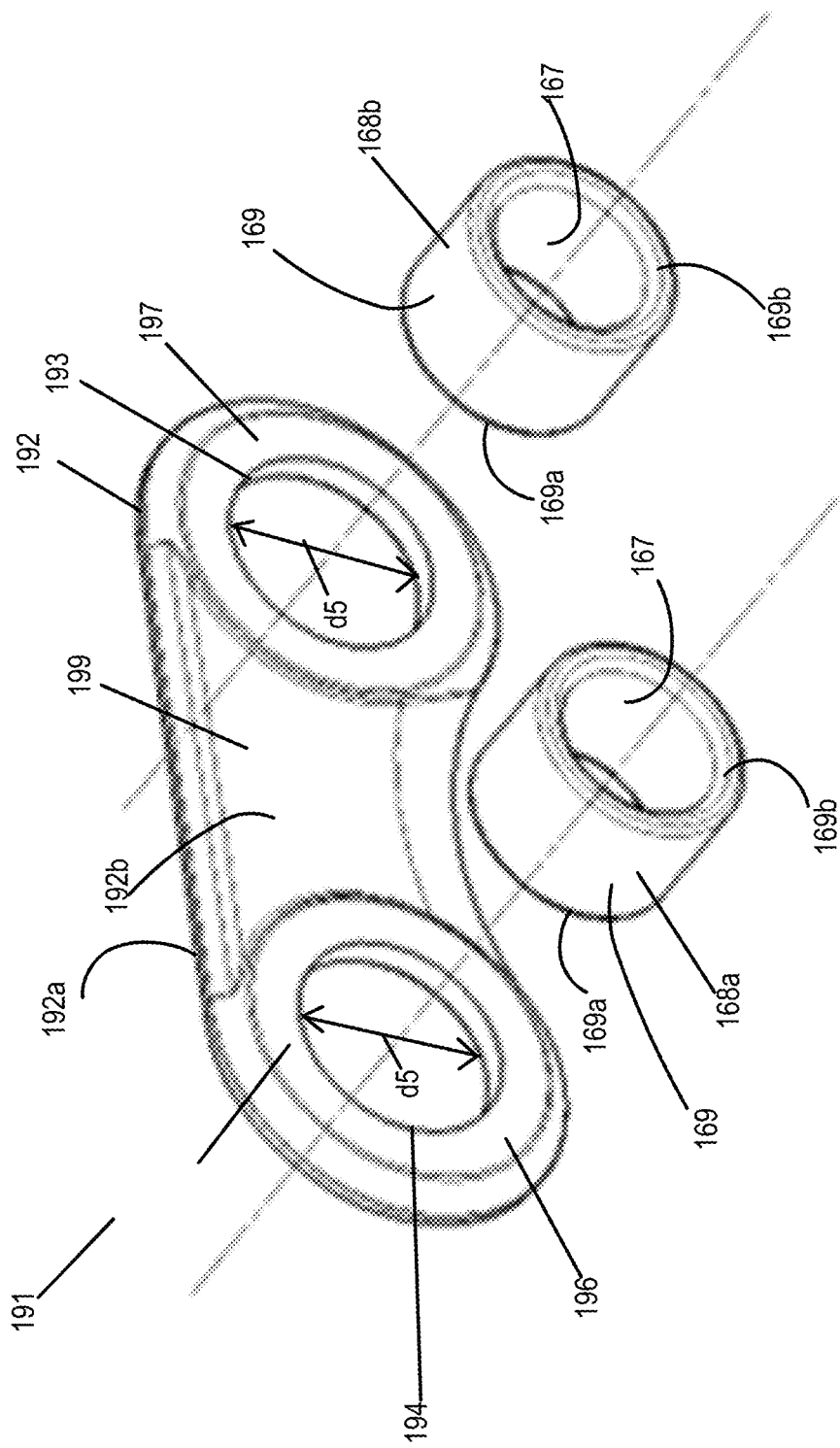
FIG. 10 shows an internal link plate of the third embodiment.
Figure 11:
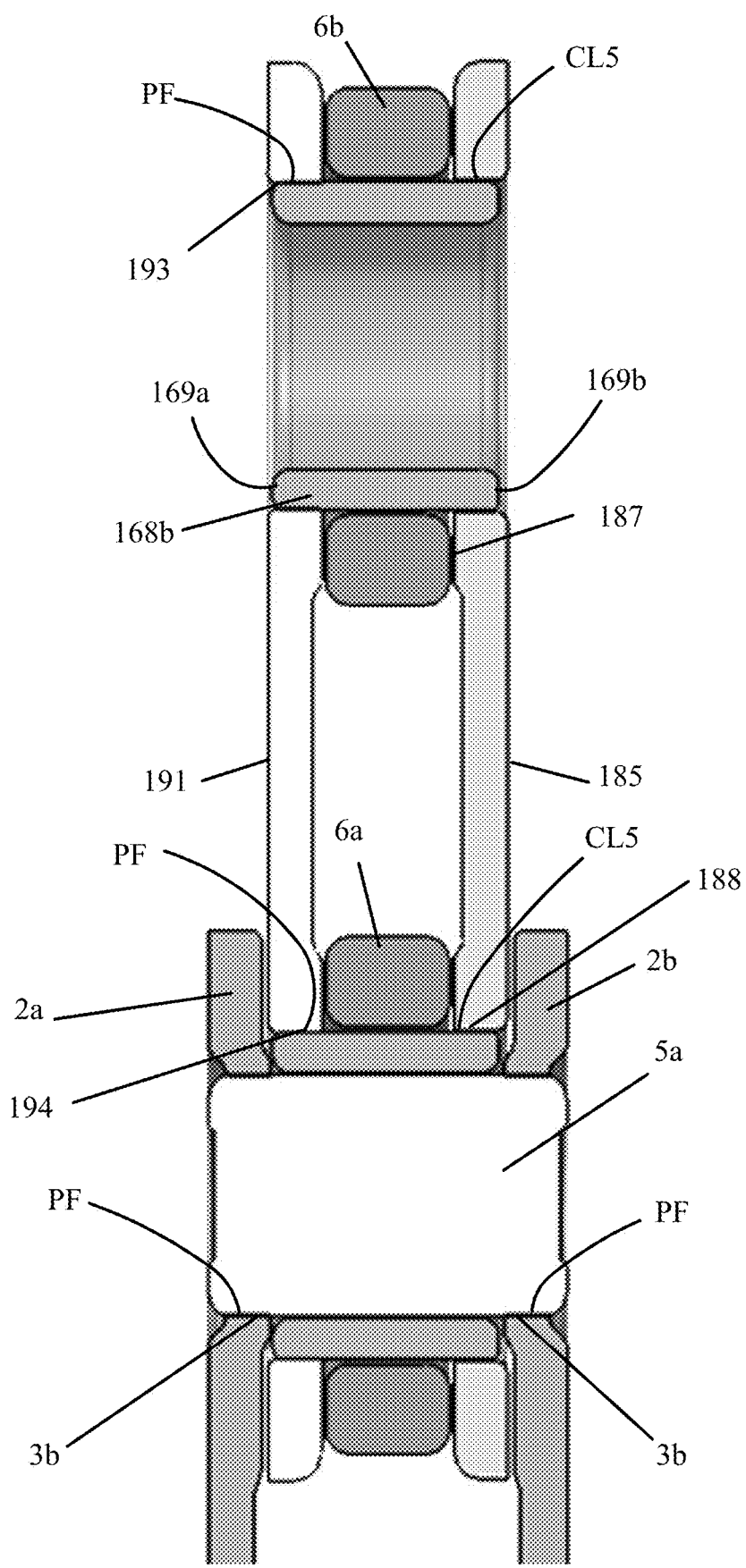
FIG. 11 shows a cross-sectional view of a portion of the laced bicycle chain of the third embodiment.

FIG. 9 shows an exploded view of the bicycle chain of a third embodiment. FIG. 10 shows an internal link of a third embodiment for a bicycle chain. FIG. 11 shows a cross-sectional view of the bicycle chain of the third embodiment. To distinguish between the two of the same link within the chain, "a" and "b" are used. The links designated "a" and "b" have the same features.

In this embodiment, the internal link assembly 190 has two different internal link plates 185, 191, rollers 6a, 6b, pins 5a, 5b and bushings 168a, 168b. The internal link assembly 190 is placed between external link plates 2a, 2b.

The first internal link plate 185 has a first internal link body 186 with a first internal link inner face 186b and a first internal link outer face 186a. The first internal link outer face 186a is adjacent to the external link plates 2. In one embodiment, the first internal link outer face 186a is flat. The first internal link body 186 further defines internal link apertures 184, 188. The internal link apertures 184, 188 each have the same diameter d6. The internal link apertures 184, 188 are separated by a middle portion 198 of the first internal link body 186. The internal link apertures 184, 188 each extend from the first internal link inner face 186b through to the first internal link outer face 186a. Surrounding internal link aperture 188 is a second aperture flat surface 189 which supports a roller 6a. Surrounding internal link aperture 184 is a first flat aperture surface 187 which supports another roller 6b. It is noted that diameter d6 is sized to allow a clearance fit relative to a second end 169b of bushings 168 described in further detail below.

The second internal link plate 191 has a second internal link body 192 with a second internal link inner face 192b and a second internal link outer face body 192a. The second internal link outer face 192a is adjacent to the external link plates 2. In one embodiment, the second internal link outer face 192a is flat. The second internal link body 192 further defines two internal link apertures 193, 194. The internal link apertures 193, 194 of the second internal link body 192 each have the same diameter d5. The diameter d5 of the internal link apertures 193, 194 of the second internal link plate 191 is smaller than the diameter d6 of the internal link apertures 184, 188 of the first internal link plate 185. The diameter d5 is sized to receive a first end 169a of bushings 168 that are press fit within the internal link apertures 193, 194. The internal link apertures 193, 194 are separated by a middle portion 199 of the second internal link body 192. The internal link apertures 193, 194 each extend from the internal link inner face 192b through to the internal link outer face 192a. Surrounding the internal link aperture 194 is a second aperture flat surface 196 which supports a roller 6a and surrounding the internal link aperture 193 is a first aperture flat surface 197 which supports another roller 6b.

Referring to FIGS. 9 and 11, a second pin 5b is received within a first external link aperture 3a of the first external link plate 2a, through the inner circumference 167 of the first end 169a of the second bushing 168b press fit into the internal link aperture 193 of the second internal link plate 191, the second end 169b of the second bushing 168b is clearance fit CL5 into the internal link aperture 184 of the first internal link plate 185. The second roller 6b surrounds the second bushing 168b. The second pin 5b further extends through the second end 169b of the second bushing 168b and through the first external link aperture 3a of the second external link plate 2b. The ends of the second pin 5b are press fit into first external link apertures 3a of the first external link plate 2a and the second external link plate 2b (indicated in FIG. 11 as PF).

It is noted that the first pin 5a will be described relative to another internal link assembly 190 adjacent to internal link plates 185, 191. A first pin 5a is received within the second external link aperture 3b of the first external link plate 2a, and an internal link aperture 194 of a second internal link plate 191 in which a first end 169a of the first bushing 168a is press fit. The first pin 5a extends through the inner circumference 167 of the first bushing 168a, through the second end 169b of the first bushing 168a, which is clearance fit into the internal link aperture 188 of the first internal link plate 185 and into the second external link aperture 3b of a second adjacent external link plate 2b. It is noted that the ends of the first pin 5a are press fit into the second external link apertures 3b of the first external link plate 2a and the second external link plate 2b (indicated in FIG. 11 as PF). The first roller 6a surrounds the first bushing 168a.

The bushings 168a, 168b support the rollers 6a, 6b. With the length of the bushings 168 being such that the first end of the first bushing 168a is press fit PF into second internal link plate 191 and the second end 169b is clearance fit CL5 into the first internal link plate 185, and provides a larger mating surface for internal link plates 185, 191 than the bushings 113 in the first embodiment. The bushings 168 additionally act as the rotating joint for the pins 5a, 5b. In one embodiment, the bushings 168 are preferably made of a different material which is harder than the internal link plates 185, 191 and the external link plates 2.

A clearance CL5 is present between the internal link apertures 184, 188 of the first internal link plate 185 and the second end 169b of the bushings 168. The first end 169a of the bushings 168 are press fit PF into the internal link apertures 193, 194 of the internal link plates 191.

The first external link plate 2a and the second external link plate 2b are in guide rows 126 within the bicycle chain. The first internal link plate 185 and the second internal link plate 191 of the internal link assembly 190 are in non-guide rows 129 within the bicycle chain. The bicycle chain has a plurality of internal link assemblies 190 interleaved and connected in a series of non-guide rows 129, with the first and second external link plates 2a, 2b placed outside of alternate rows of internal link assemblies 190 within guide rows 126.

Figure 12:
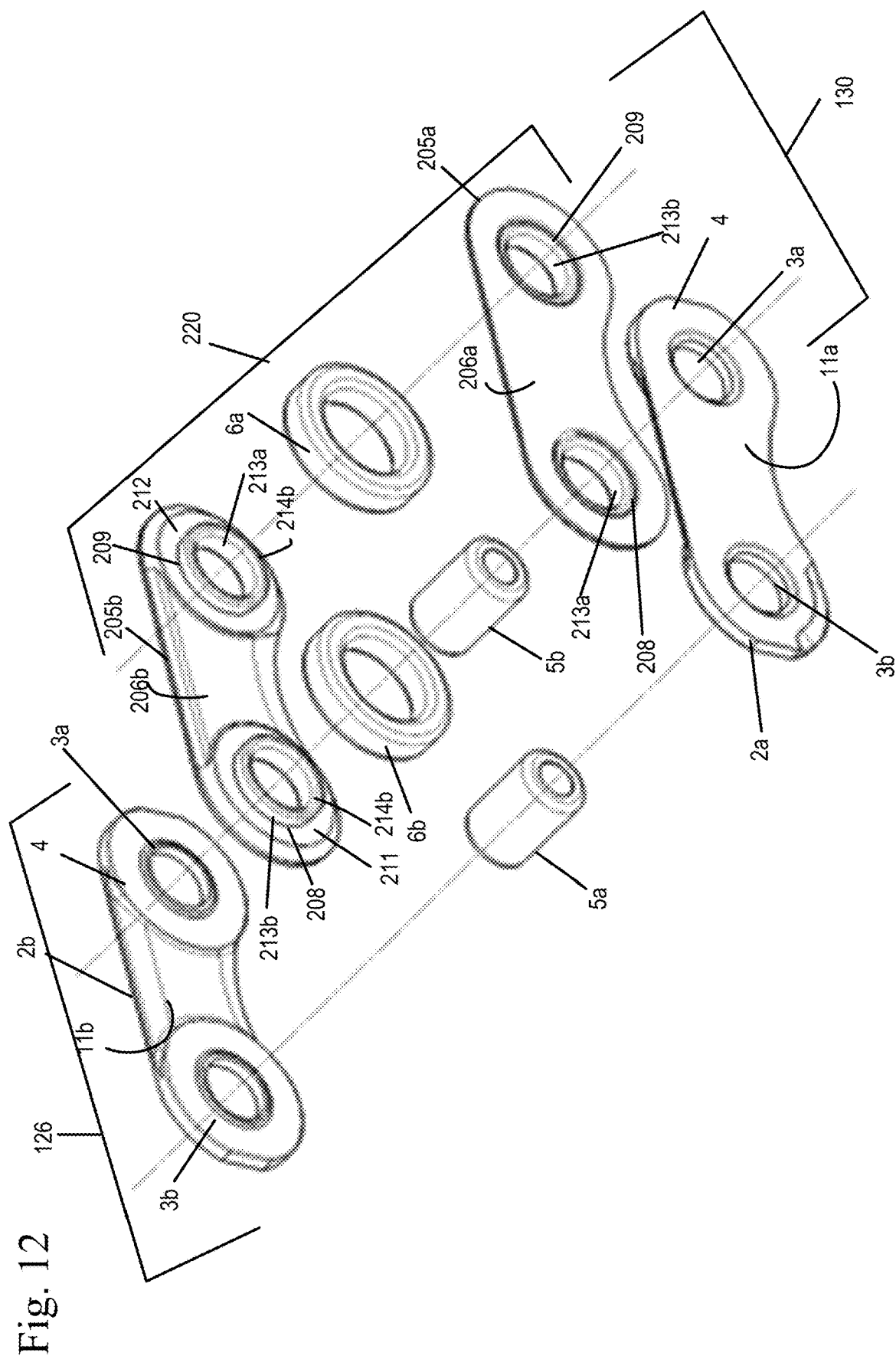
FIG. 12 shows an exploded view of a portion of a bicycle chain of a fourth embodiment.
Figure 13:
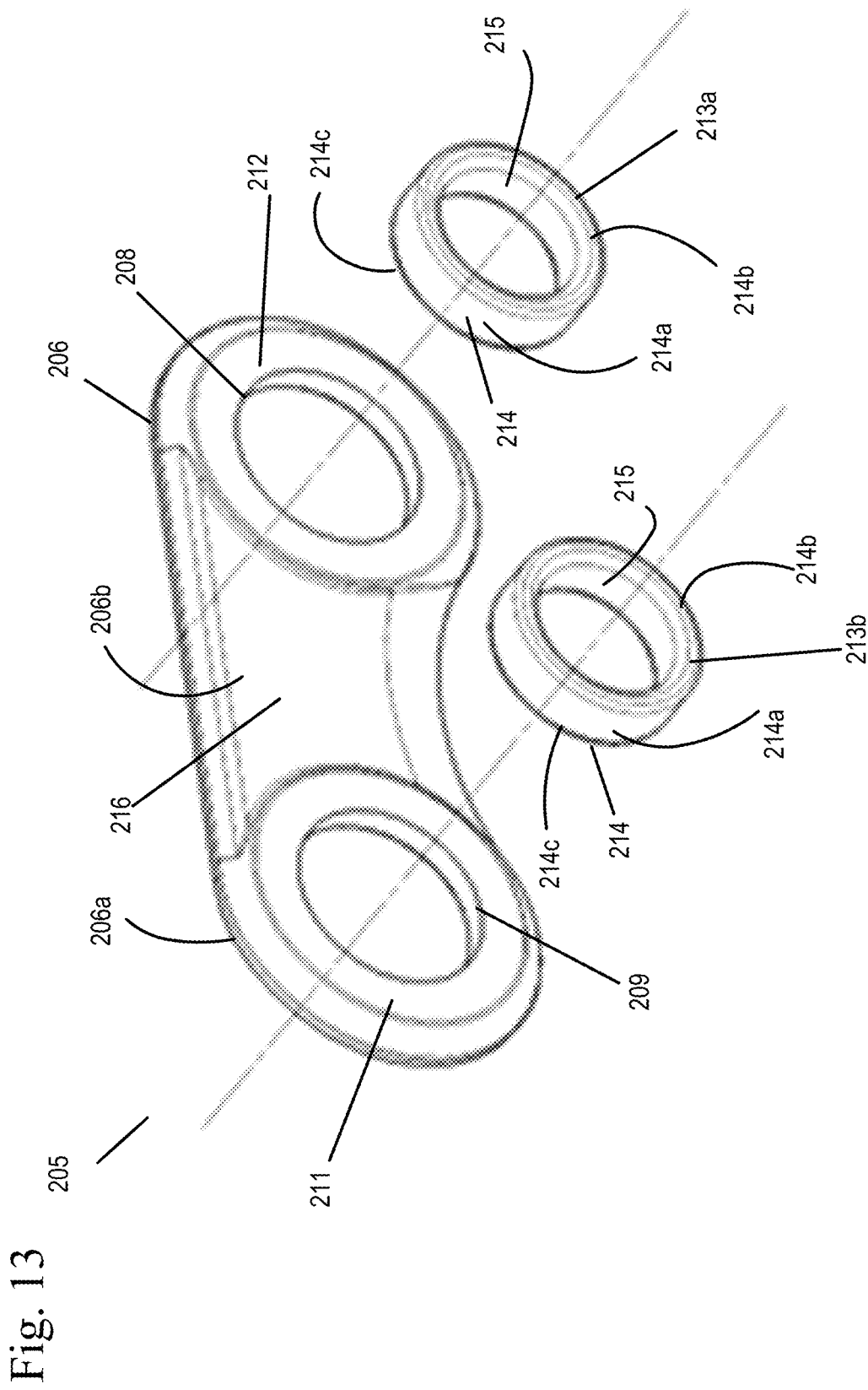
FIG. 13 shows an internal link plate of the fourth embodiment.
Figure 14:
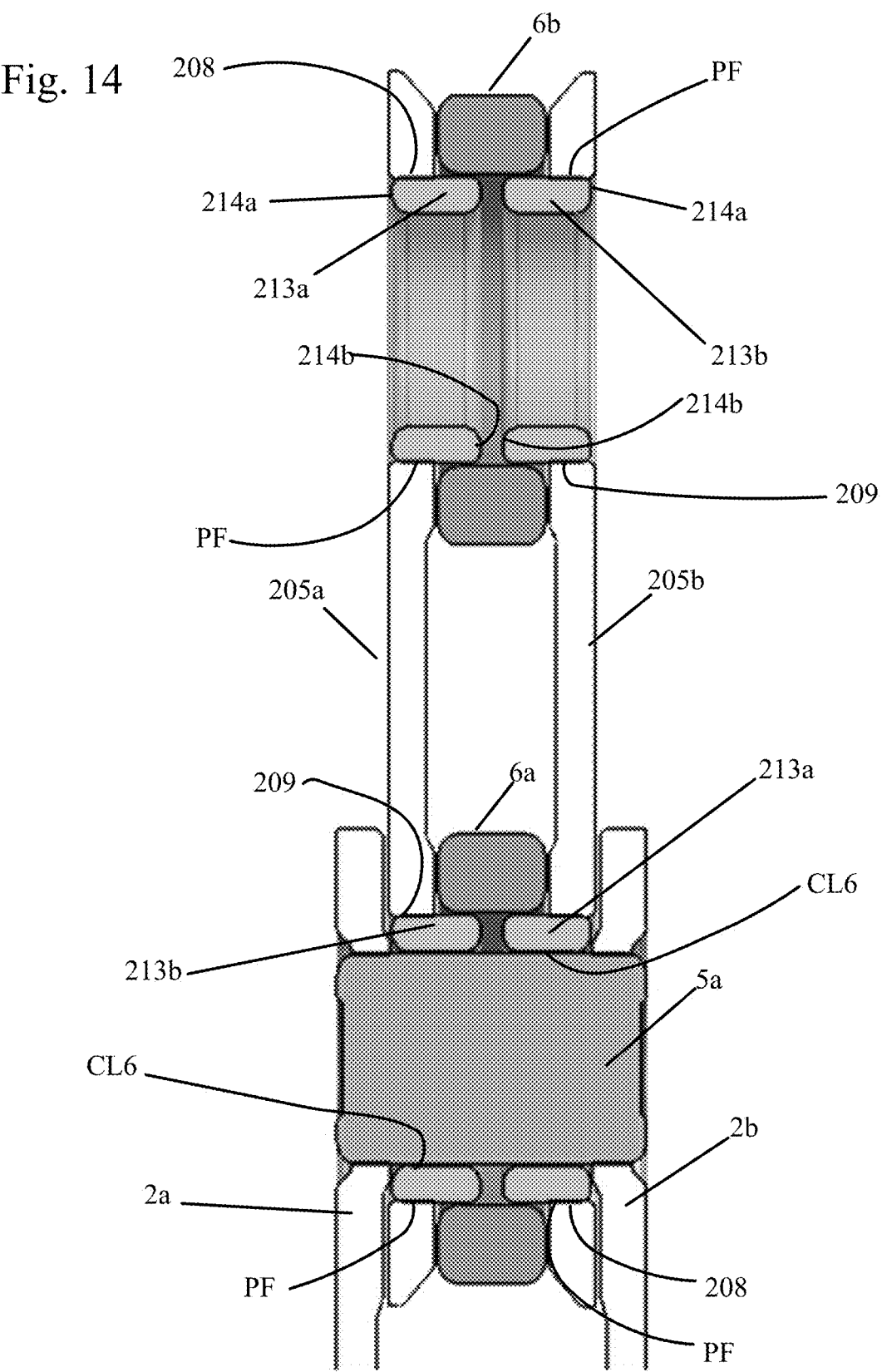
FIG. 14 shows a cross-sectional view of a portion of the laced bicycle chain of the fourth embodiment.

FIG. 12 shows an exploded view of the bicycle chain of the fourth embodiment. FIG. 13 shows an internal link of a fourth embodiment for a bicycle chain. FIG. 14 shows a cross-sectional view of the bicycle chain of the fourth embodiment. To distinguish between the two internal link plates 205 of an internal link assembly 220, since the same internal link plate 205 is used, but flipped and rotated 180 degrees, the parts of the internal link plates are designated with the same number, with the two different internal link plates 205 being designated with an "a" or "b". It is noted that internal link plate 205a has the same features as internal link plate 205b. Similarly, to distinguish between the two of the same external link plates 2 within the chain, "a" and "b" are used. The links designated "a" and "b" have the same features.

In this embodiment, the internal link plates 205a, 205b each has an internal link body 206 with an internal link inner face 206b and an internal link outer face 206a. In one embodiment, the internal link outer face 206a is flat. The internal link outer face 206a is adjacent to the external link plates 2 within the bicycle chain. The internal links 205a, 205b are symmetric about a centerline.

The internal link body 206 further defines a first internal link aperture 208 and a second internal link aperture 209. The diameter of the second internal link aperture 209 and the first internal link aperture 208 are sized to receive a second end 214c of a bushing 213a, 213b which is press fit therein. The first internal link aperture 208 and the second internal link aperture 209 are separated by a middle portion 216 of the internal link body 206. The first internal link aperture 208 and the second internal link aperture 209 each extend from the internal link inner face 206b through to the internal link outer face 206a.

The bushings 213a, 213b each has a body 214 defining a circumferential inner surface 215, an outer circumference 214a, a first end 214b and a second end 214c. The second ends 214c of bushings 213a, 213b are press fit into the internal link apertures 208, 209 of the internal links 205a, 205b. The circumferential inner surface 215 of the bushings 213a, 213b is sized to receive a pin 5a, 5b with a clearance fit.

Surrounding the second internal link aperture 209 is a second aperture flat surface 211 which supports a roller 6b. Surrounding the first internal link aperture 208 is a first aperture flat surface 212 which supports another roller 6a.

Referring to FIGS. 12 and 14, an internal link assembly 220 which includes a first internal link plate 205a, a second internal link plate 205b rotated 180 degrees from the first internal link plate 205a, a first roller 6a, a second roller 6b, a first pin 5a, a second pin 5b, a first bushing 213a and a second bushing 213b. The internal link assembly 220 is placed between external link plates 2a, 2b.

A second pin 5b is received within a first external link aperture 3a of the first external link plate 2a, the first internal link aperture 208 of the first internal link plate 205a with the second end 214b of the bushing 213a is press fit therein, through a second roller 6a which is received on the outer circumference 214a of the bushing 213a. From the bushing 213a, the second pin 5b is received within the circumferential inner surface 115 of another bushing 213b press fit within the first internal link aperture 208 of second internal link plate 205b. The second pin 5b further extends through the first external link aperture 3a of the second external link plate 2b. It is noted that the first ends 214a of the bushings 213b in each of the internal link plates 205a, 205b, when in the internal link assembly 220 are adjacent and captured within the roller 6b but do not contact as shown in FIG. 14.

It is noted that the first pin 5a will be described relative to an adjacent internal link plates 205a, 205b of an adjacent internal link assembly 220. The first pin 5a is received within the second external link aperture 3b of the first external link plate 2a, the second internal link aperture 209 of the first internal link plate 205a with the second end 214b of the bushing 213b being press fit therein, and through a first roller 6a which is received on the outer circumference 214a of the bushing 213b. The first pin 5a further extends within the circumferential inner surface 115 of another bushing 213a press fit within the second internal link aperture 209 of internal link plate 205b. The first pin 5a further extends through the second external link aperture 3b of the second external link plate 2b. It is noted that the first ends 214a bushings 213b in each of the internal link plates 205a, 205b when in the internal link assembly 220 are adjacent and captured within the roller 6b but do not contact as shown in FIG. 14. The bushings 213 support the rollers 6.

As shown in FIG. 14, the second ends 214b of the bushings 213a, 213b are press fit PF into the internal link apertures 208, 209 of the internal link plates 205a, 205b. Additionally, a clearance CL6 is present between the pin 5a, 5b and the bushings 213a, 213b.

It is noted that the length of the bushings 213a, 213b is less than the length of the bushings 113, 168 in the other embodiments.

The first external link plate 2a and the second external link plate 2b are in guide rows 126 within the bicycle chain. The first internal link plate 205a and the second internal link plate 205b of the internal link assembly 220 are in non-guide rows 130 within the bicycle chain. The bicycle chain has a plurality of internal link assemblies 220 interleaved and connected in a series of non-guide rows 130, with the first and second external link plates 2a, 2b placed outside of alternate rows of internal link assemblies 220 within guide rows 126.

Figure 15:
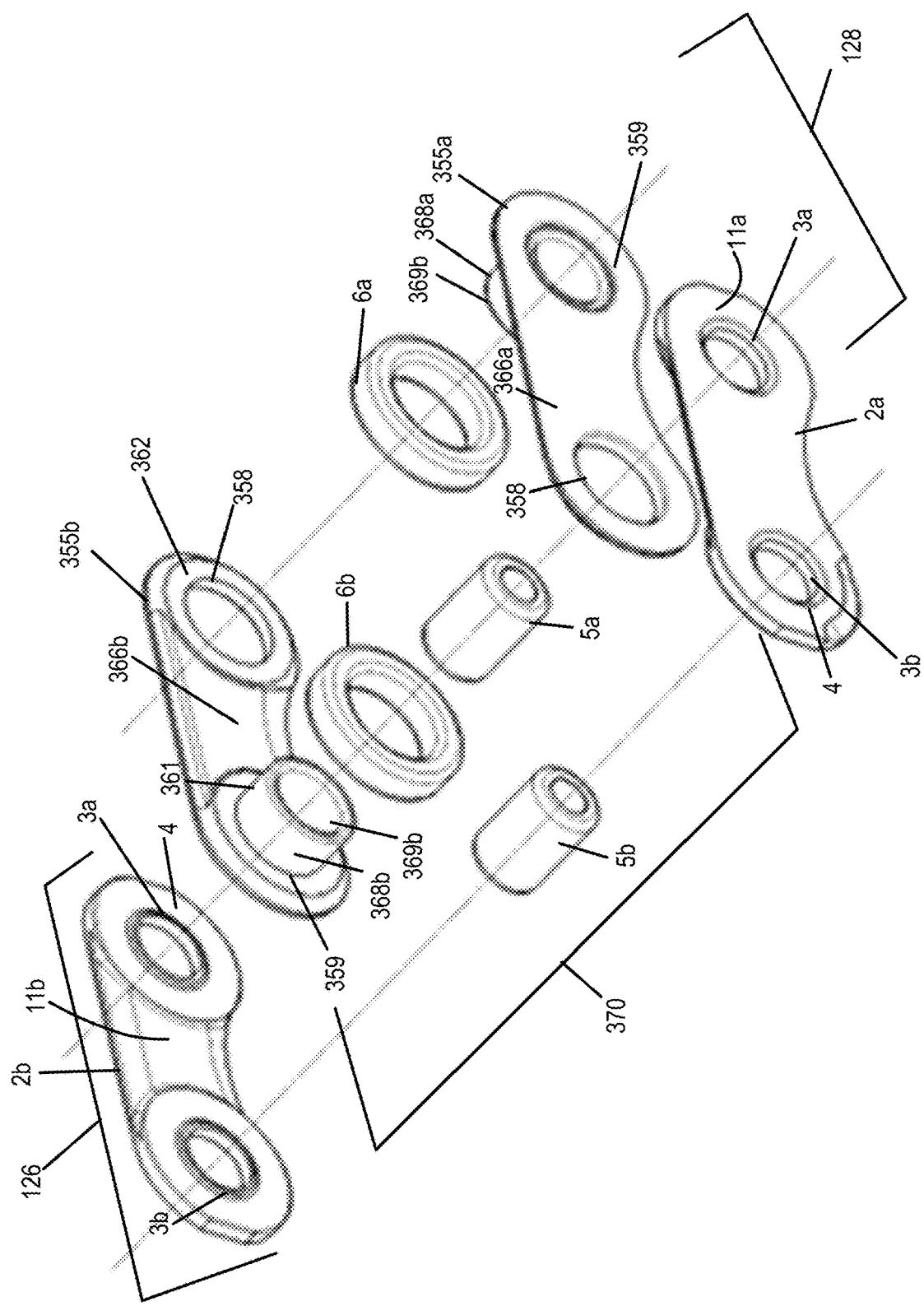
FIG. 15 shows an exploded view of a portion of a bicycle chain of a fifth embodiment.
Figure 16:
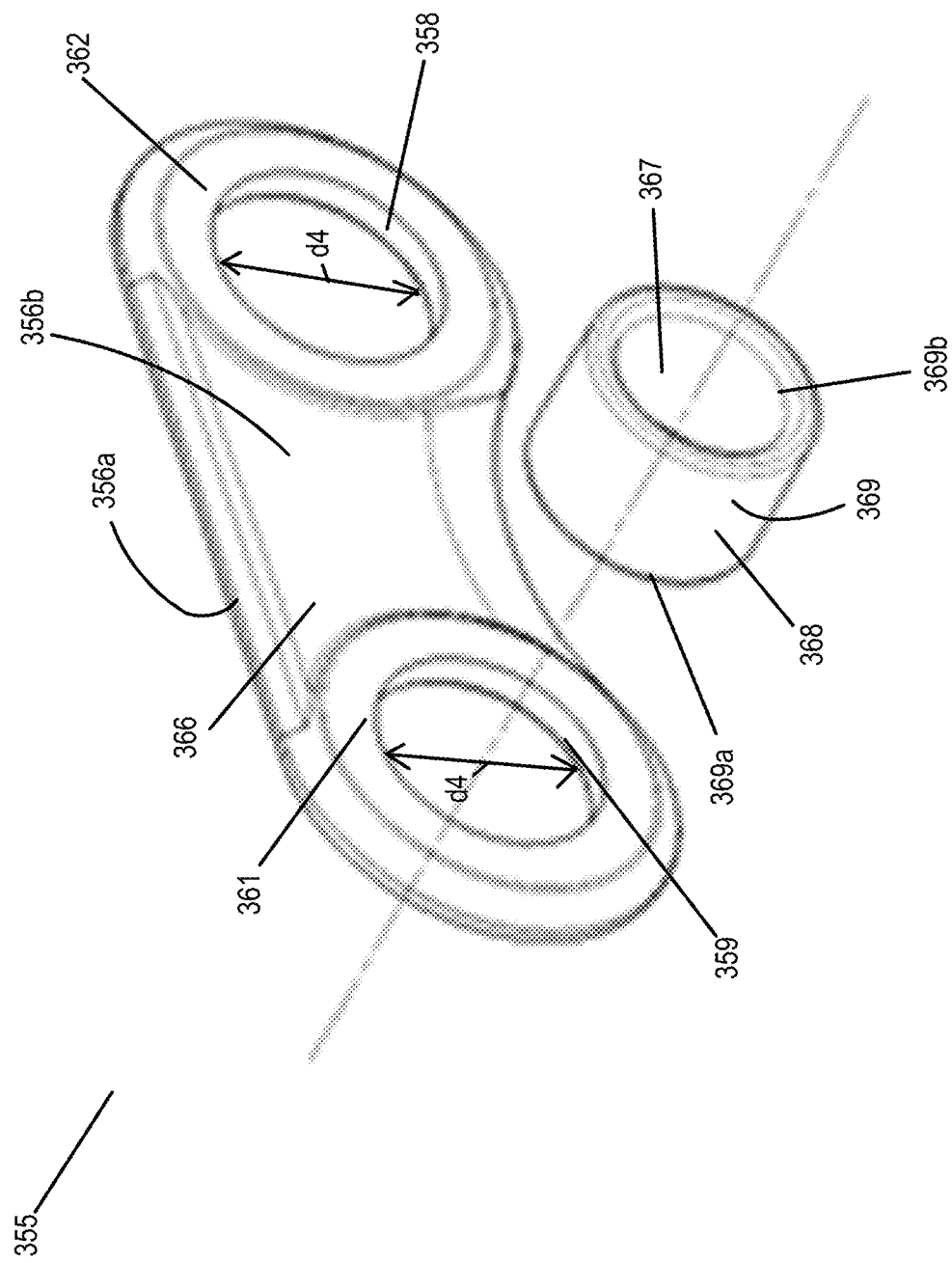
FIG. 16 shows an internal link plate of the fifth embodiment.
Figure 17:
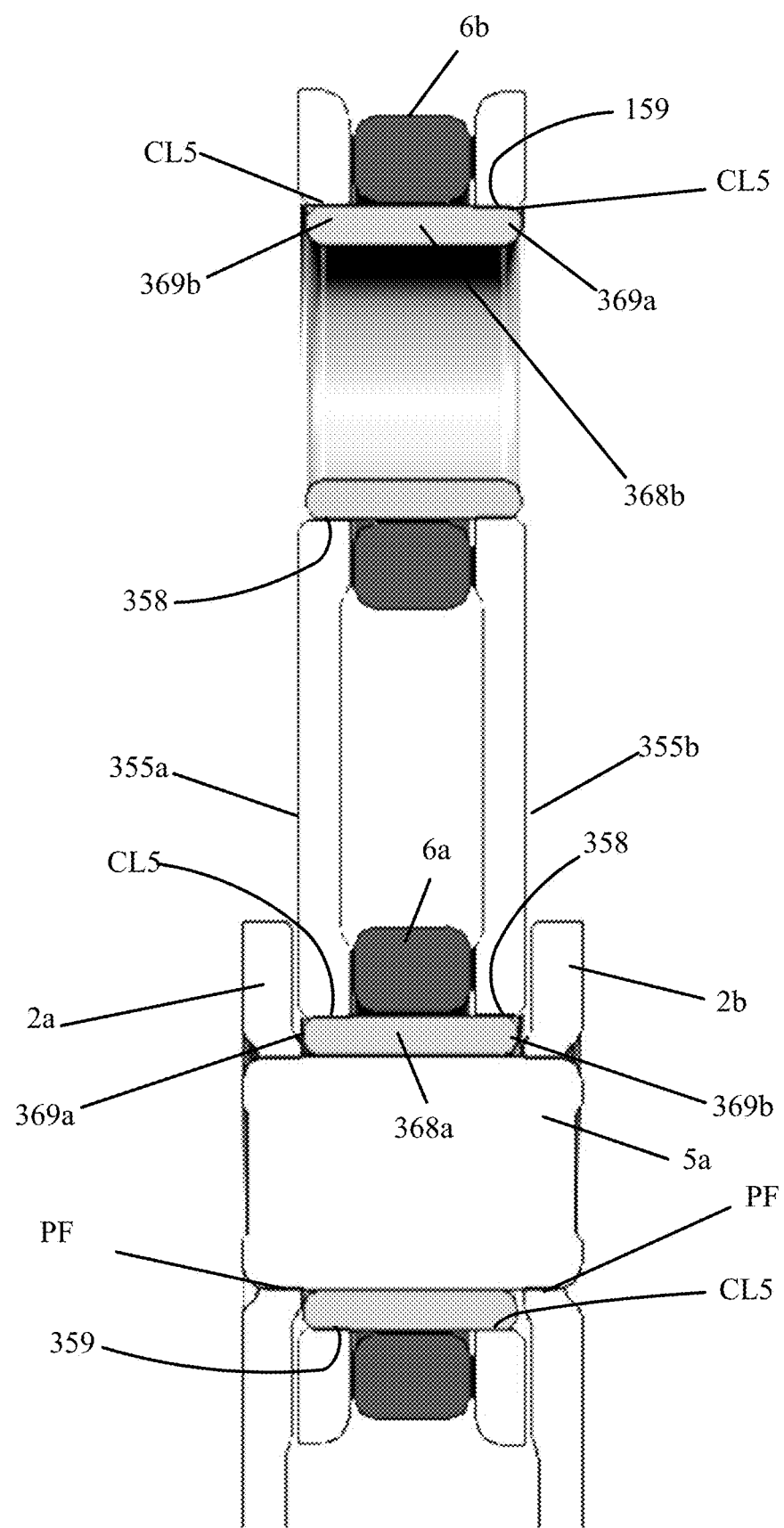
FIG. 17 shows a cross-sectional view of a portion of the laced bicycle chain of the fifth embodiment.

FIG. 15 shows an exploded view of the bicycle chain of a fifth embodiment. FIG. 16 shows an internal link of a fifth embodiment for a bicycle chain. FIG. 17 shows a cross-sectional view of the bicycle chain of the fifth embodiment.

To distinguish between the two internal link plates 355 of an internal link assembly 370, since the same internal link plate 355 is present, but flipped and rotated 180 degrees, the parts of the internal link plates are designated with the same number, with the two different internal link plates 155 being designated with an "a" or "b". It is noted that internal link plate 355a has the same features as internal link plate 355b.

Similarly, to distinguish between the two of the same external links 2 within the bicycle chain, "a" and "b" are used. The links designated "a" and "b" but with the same number, have the same features.

In this embodiment, the internal link plates 355a, 355b each has an internal link body 356 with an internal link inner face 356b and an internal link outer face 356a. In one embodiment, the internal link outer face 356a is flat. The internal link outer faces 356a are adjacent to external link plates 2. The internal link plates 355a, 355b are asymmetric about a vertical centerline.

The internal link body 356 further defines a first internal link aperture 358 and a second internal link aperture 359 each with a diameter d4. The first internal link aperture 358 and the second internal link aperture 359 are separated by a middle portion 366 of the internal link body 356. The first internal link aperture 358 and the second internal link aperture 359 each extend from the internal link inner face 356b through to the internal link outer face 356a. The second internal link aperture 359 receives a bushing 368, which is preferably clearance fit therein. More specifically, a first end 369a of the bushing 368 is clearance fit into the second internal link aperture 359 of a first internal link plate 355a. The bushing 368 has a circumferential inner surface 165 and an outer circumference 364. It is noted that the bushing 368 is longer in length than the bushing 113 of the first embodiment so that a second end 369b of the same bushing 368 is received within a second internal link aperture 359 in a clearance fit of a second internal link plate 355b.

Surrounding the second internal link aperture 359 is a second aperture flat surface 361 which supports a roller 6b. Surrounding the first internal link aperture 358 is a first aperture flat surface 362 which supports another roller 6a.

Referring to FIGS. 15 and 17, an internal link assembly 370 which includes a first internal link plate 355a, a second internal link plate 355b rotated 180 degrees from the first internal link plate 355a, a first roller 6a, a second roller 6b, a first pin 5a, a second pin 5b, a first bushing 368a and a second bushing 368b. The internal link assembly 370 is placed between external link plates 2a, 2b.

A first pin 5a is received within a first external link aperture 3a of the first external link plate 2a, the inner circumference 367 of the second end 369b of the second bushing 368b is clearance fit into the first internal link aperture 358 of the first internal link plate 355a, the first end 369a of the second bushing 368b clearance fit into the second internal link aperture 359 of the second internal link plate 355b to the second internal link plate 355b. The second roller 6b surrounds the second bushing 368b. The first pin 5a further extends through the first external link aperture 3a of the second external link plate 2b.

It is noted that the second pin 5b will be described relative to an adjacent internal link plate to internal link plates 355a, 355b. A second pin 5b is received within the second external link aperture 3b of the first external link plate 2a, a second internal link aperture 359 of an adjacent first internal link plate to first internal link plate 355a in which a first end 369a of the first bushing 368a is clearance fit, and the second pin 5b passes through the inner circumference 367 of the first bushing 368a, through the second end 369b of the first bushing 368a, which is clearance fit into the first internal link aperture 358 of a second internal link plate 355b and into the second external link aperture 3b of external link plate 2b. The first roller 6a surrounds the outer circumference 369 of the first bushing 368a. The bushings 368a, 368b support the rollers 6a, 6b.

With the length of the bushings 368 being such that the first end 369a is clearance fit into a first internal link plate 355a and the second end 369b is clearance fit into the second internal link plate 355b, and provides a larger mating surface for internal link plates 355 than the bushings 113 in the first embodiment. In one embodiment, the bushings 368 are preferably made of a different material which is harder than the internal link plates 355 and the external link plates 2.

A clearance CL5 is present between the first internal link aperture 358 of the internal link plates 355 and the second end 369b of the bushings 368 and the first end 369a of the bushings 368 into the second internal link apertures 359 of the internal link plates 355.

The first external link plate 2a and the second external link plate 2b are in guide rows 126 within the bicycle chain. The internal link plates 355a, 355b of the internal link assembly 370 are in non-guide rows 128 within the bicycle chain. The bicycle chain has a plurality of internal link assemblies 370 interleaved and connected in a series of non-guide rows 128, with the first and second external link plates 2a, 2b placed outside of alternate rows of internal link assemblies 370 within the guide rows 126.

Therefore, the ends of the first and second pins 5a, 5b are press fit into the external link plates 2a, 2b and the bushings 368 are free to float within each of the internal link plates 355a, 355b through the clearance fit. The first and second pins 5a, 5b are clearance fit relative to the bushings 368. The bushings 368 additionally support the rollers 6a, 6b.

Figure 18B:
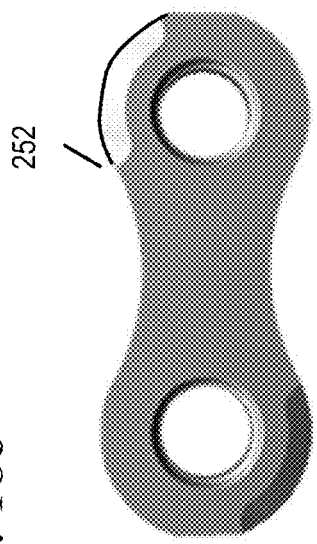
FIGS. 18a-18b show alternate external link plates with FIG. 18a showing a "B-shaped" external link and FIG. 18b showing an "8-shaped" external link.
Figure 18A:
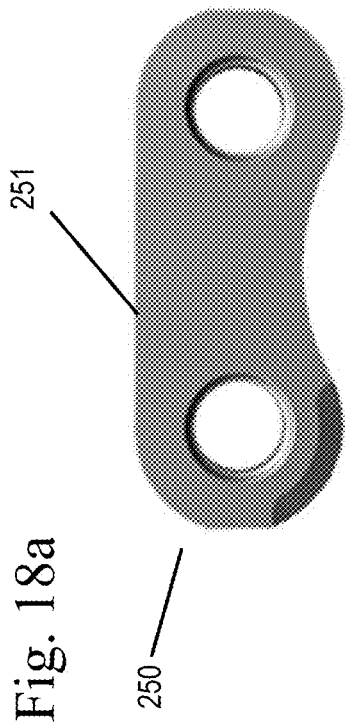

Other link shapes may be used for the internal link plates or the external link plates in the bicycle chain of the present invention. For example, as shown in FIG. 18a, the external link plates 2a, 2b can be replaced with external link plates 250 with a B-shape. This link shape requires orientation during chain assembly to ensure that the flat back 251 of the link plate 250 is at the top or outside of the bicycle chain. The external link plates 2a, 2b can be replaced with external link plates 252 with an "8-shaped" body as shown in FIG. 18b. These external link plates 252 do not require specific orientation during chain assembly.

Figure 19B:
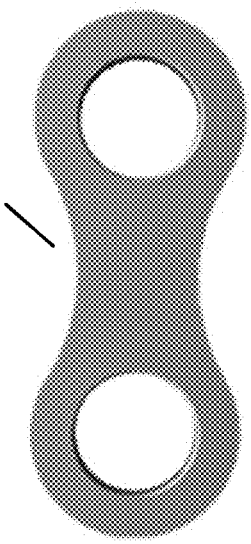
FIGS. 19a-19b show alternate internal links with FIG. 19a showing a "B-shaped" internal link and FIG. 19b showing an "8-shaped" internal link.
Figure 19A:
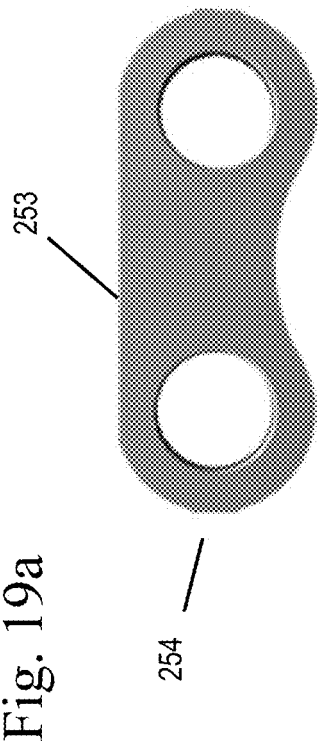

FIG. 19a shows a B-shaped internal link plate 254 that can replace internal link plates 105, 205, 191, 185, 155, 355 discussed above. It is noted that the shape of the apertures within the internal link plates 105, 205, 191, 185, 155, 355 would remain the same. This link shape requires orientation during chain assembly to ensure that the flat back 253 of the link plate 254 is at the top or outside of the chain. Alternatively, the internal link plates 105, 205, 191, 185, 155, 355 can also be replaced with an with an "8-shaped" body as shown in FIG. 19b.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A bicycle chain comprising:
a plurality of internal link assemblies interleaved and connected into a series of non-guide rows, each internal link assembly comprising:
a first internal link plate comprising a first internal link body having a first internal link inner face, a first internal link outer face opposite the first internal link inner face, the first internal link body defining a first internal link aperture, a second internal link aperture separated from the first internal link aperture by a middle portion, the first internal link aperture and the second internal link aperture extending from the first internal link inner face through to the first internal link outer face;
a second internal link plate comprising a second internal link body having a second internal link inner face, a second internal link outer face opposite the second internal link inner face, the second internal link body defining a first internal link aperture, a second internal link aperture separated from the first internal link aperture by a middle portion, the first internal link aperture and the second internal link aperture extending from the second internal link inner face through to the second internal link outer face;
a first internal link plate bushing having a first end, a second end, an outer circumference and a circumferential inner surface;
a second internal link plate bushing having an outer circumference, a circumferential inner surface, a first end and a second end;
wherein the first internal link body is rotated 180 degrees relative to the second internal link body, such that the first end of the first internal link plate bushing is clearance fit into the second internal link aperture of the first internal link body and the second end of the first internal link plate bushing is clearance fit into the first internal link aperture of the second internal link body and the first end of the second internal link plate bushing is clearance fit into the second internal link aperture of the second internal link body and the second end of the second internal link plate bushing is clearance fit into the first internal link aperture of the first internal link body;
a plurality of external link plates each of the external link plates having a pair of apertures, the external link plates being placed outside of alternate rows of internal link assemblies to form guide rows;
rollers received between the second internal link inner face of the second internal link body and the first internal link inner face of the first internal link body and on the first internal link plate bushing and the second internal link plate bushing; and
connecting pins extending across the rows of the bicycle chain and having ends received by the pair of apertures of the plurality of external link plates, thereby connecting the external link plates and the internal link assemblies;
wherein at least a first connecting pin is received within a first aperture of a first external link plate of the plurality of external link plates, a first internal link aperture of the first internal link plate, through the second internal link plate bushing, the second internal link aperture of the second internal link plate, and the first aperture of a second external link plate of the plurality of external link plates, and at least a second connecting pin is received within the second aperture of the second external link plate, a second internal link aperture of the first internal link plate, through the first internal link plate bushing, through the first internal link aperture of the second internal link plate and the second aperture of the second external link plate.

2. The bicycle chain of claim 1, further comprising a clearance fit present between the first connecting pin and the second internal link plate bushing and the second connecting pin and the first internal link plate bushing.

3. The bicycle chain of claim 1, further comprising a first aperture flat surface surrounding the first internal link aperture on the internal link inner face and a second aperture flat surface surrounding the second internal link aperture on the internal link inner face of each of the first internal link plate and the second internal link plate.

4. The bicycle chain of claim 3, wherein the rollers are adjacent to the first aperture flat surface and the second aperture flat surface of each of the first internal link plate and the second internal link plate.

5. The bicycle chain of claim 1, wherein the first internal link plate bushing and the second internal link plate bushing each support at least one roller.

6. The bicycle chain of claim 1, wherein the first internal link outer face of the first internal link plate and the first internal outer face of the second internal link plate is flat.

\* \* \* \* \*